US010585489B2

(12) United States Patent
Han et al.

(10) Patent No.: US 10,585,489 B2
(45) Date of Patent: Mar. 10, 2020

(54) TECHNOLOGIES FOR MICRO-MOTION-BASED INPUT GESTURE CONTROL OF WEARABLE COMPUTING DEVICES

(71) Applicant: INTEL CORPORATION, Santa Clara, CA (US)

(72) Inventors: Ke Han, Shanghai (CN); Jinkui Ren, Shanghai (CN); Xun Wang, Shanghai (CN); Lili Ma, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 69 days.

(21) Appl. No.: 15/576,493

(22) PCT Filed: Jun. 26, 2015

(86) PCT No.: PCT/CN2015/082551
§ 371 (c)(1),
(2) Date: Nov. 22, 2017

(87) PCT Pub. No.: WO2016/206117
PCT Pub. Date: Dec. 29, 2016

(65) Prior Publication Data
US 2018/0164892 A1  Jun. 14, 2018

(51) Int. Cl.
*G06F 3/033* (2013.01)
*G06F 3/01* (2006.01)
(Continued)

(52) U.S. Cl.
CPC .............. *G06F 3/017* (2013.01); *G06F 1/163* (2013.01); *G06F 3/014* (2013.01); *G06F 3/0346* (2013.01)

(58) Field of Classification Search
None
See application file for complete search history.

(56) References Cited

U.S. PATENT DOCUMENTS

| 8,565,535 B2 | 10/2013 | Shamaie |
| 2005/0212760 A1* | 9/2005 | Marvit .................. G06F 1/1613 345/156 |

(Continued)

FOREIGN PATENT DOCUMENTS

| JP | 2008146645 | 6/2008 |
| JP | 2010537320 | 12/2010 |
| JP | 2015069396 | 11/2017 |

OTHER PUBLICATIONS

Doo Young Kwon et al., A Framework for 3D Spatial Gesture Design and Modeling Using a Wearable Input Device, Oct. 1, 2007, IEEE, pp. 1-4 (Year: 2007).*

(Continued)

*Primary Examiner* — Tam T Tran
(74) *Attorney, Agent, or Firm* — Barnes & Thornburg LLP

(57) ABSTRACT

Technologies for detecting micro-motion based input gestures include a wrist-wearable computing device that includes sensors from which values for micro-motion states can be determined. Each micro-motion state is indicative of a motion-related characteristic of the wrist-wearable computing device that is used to determine whether a sequence of detected gesture steps matches an input gesture model associated with an input gesture. The input gesture model defines a required sequence of required gesture steps from which an input gesture may be determined.

25 Claims, 14 Drawing Sheets

(51) Int. Cl.
G06F 3/0346 (2013.01)
G06F 1/16 (2006.01)

(56) References Cited

U.S. PATENT DOCUMENTS

| | | |
|---|---|---|
| 2008/0136679 A1 | 6/2008 | Newman |
| 2009/0052785 A1* | 2/2009 | Shamaie ............... G06F 3/017 |
| | | 382/209 |
| 2012/0313847 A1 | 12/2012 | Boda et al. |
| 2013/0147701 A1 | 6/2013 | Cripps |
| 2015/0177841 A1 | 6/2015 | Vanblon et al. |
| 2016/0059120 A1* | 3/2016 | Komorous-King .......................... |
| | | A63F 13/211 |
| | | 463/36 |

OTHER PUBLICATIONS

Roman Amstutz et al., Performance analysis of an HMM-based gesture recognition using a wristwatch device, Aug. 1, 2009, IEEE, pp. 1-7 (Year: 2009).*
Japanese Office action for Japanese patent application No. 2017-560749 dated Mar. 26, 2019, including translation (10 pages).
Extended European search report for European patent application No. 15896013.8, dated Dec. 19, 2018 (7 pages).
PCT Search Report and Written Opinion for PCT/CN2015/082551, completed Feb. 18, 2016.

* cited by examiner

| MICRO-MOTION STATE | ACCEPTABLE VALUES |
|---|---|
| MOTION | STILL / SLOW MOVE / FAST MOVE |
| ORIENTATION | X; Y; Z / -X; -Y; -Z / UNKNOWN |
| ROTATION-X | SLOW (X / -X) / FAST (X / -X) / NONE |
| ROTATION-Y | SLOW (Y / -Y) / FAST (Y / -Y) / NONE |
| ROTATION-Z | SLOW (Z / -Z) / FAST (Z / -Z) / NONE |
| LINEAR MOTION-X | X / -X / NONE |
| LINEAR MOTION-Y | Y / -Y / NONE |
| LINEAR MOTION-Z | Z / -Z / NONE |
| IMPACT | NONE / SMALL / LARGE |
| SHAKING | YES / NO |

FIG. 5

| STATE | GESTURE STEP 1 | GESTURE STEP 2 | GESTURE STEP 3 | GESTURE STEP 4 | GESTURE STEP 5 | GESTURE STEP 6 |
|---|---|---|---|---|---|---|
| MOTION | STILL | SLOW MOVE FAST MOVE | FAST MOVE | SLOW MOVE FAST MOVE | SLOW MOVE | STILL |
| ORIENTATION | Z -X; -Y | -X UNKNOWN | UNKNOWN | -X UNKNOWN | -X | -X |
| ROTATION-X | NONE | SLOW (X / -X) FAST (X / -X) | FAST (X / -X) | FAST (X / -X) | NONE | NONE |
| ROTATION-Y | N/A | N/A | N/A | N/A | N/A | N/A |
| ROTATION-Z | N/A | N/A | N/A | N/A | N/A | N/A |
| LINEAR MOTION-X | NONE | NONE | NONE | NONE | NONE | NONE |
| LINEAR MOTION-Y | NONE | NONE | NONE | NONE | NONE | NONE |
| LINEAR MOTION-Z | NONE | NONE | NONE | NONE | NONE | NONE |
| IMPACT | NONE | NONE | SMALL LARGE | NONE | NONE | NONE |
| SHAKING | NO | NO | NO | NO | NO | NO |
| MAX DELTA TIME | N/A | N/A | 200 ms | 200 ms | 200 ms | 200 ms |

FIG. 6

| STATE | GESTURE STEP 1 | GESTURE STEP 2 | GESTURE STEP 3 |
|---|---|---|---|
| MOTION | STILL | SLOW MOVE | FAST MOVE |
| ORIENTATION | Z | -X | UNKNOWN |
| ROTATION-X | NONE | SLOW X | FAST X |
| ROTATION-Y | - | - | - |
| ROTATION-Z | - | - | - |
| LINEAR MOTION-X | NONE | NONE | NONE |
| LINEAR MOTION-Y | NONE | NONE | NONE |
| LINEAR MOTION-Z | NONE | NONE | NONE |
| IMPACT | NONE | NONE | SMALL |
| SHAKING | NO | NO | NO |
| MAX DELTA TIME | N/A | N/A | 180 ms |

FIG. 7

| STATE | GESTURE STEP 1 | GESTURE STEP 2 | GESTURE STEP 3 | GESTURE STEP 4 | GESTURE STEP 5 | GESTURE STEP 6 |
|---|---|---|---|---|---|---|
| MOTION | STILL | SLOW MOVE | FAST MOVE | FAST MOVE | SLOW MOVE | STILL |
| ORIENTATION | Z | -X | UNKNOWN | -X | -X | -X |
| ROTATION-X | NONE | SLOW X | FAST X | FAST X | NONE | NONE |
| ROTATION-Y | -- | -- | -- | -- | -- | -- |
| ROTATION-Z | -- | -- | -- | -- | -- | -- |
| LINEAR MOTION-X | NONE | NONE | NONE | NONE | NONE | NONE |
| LINEAR MOTION-Y | NONE | NONE | NONE | NONE | NONE | NONE |
| LINEAR MOTION-Z | NONE | NONE | NONE | NONE | NONE | NONE |
| IMPACT | NONE | NONE | SMALL | NONE | NONE | NONE |
| SHAKING | NO | NO | NO | NO | NO | NO |
| MAX DELTA TIME | N/A | N/A | 180 ms | 100 ms | 160 ms | 120 ms |

FIG. 8

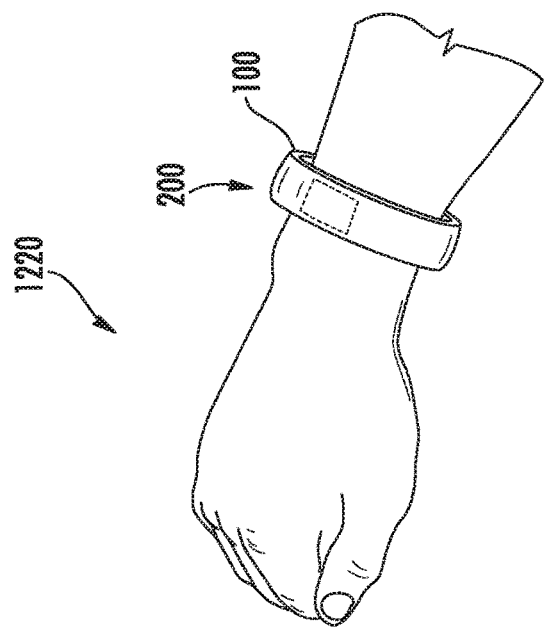
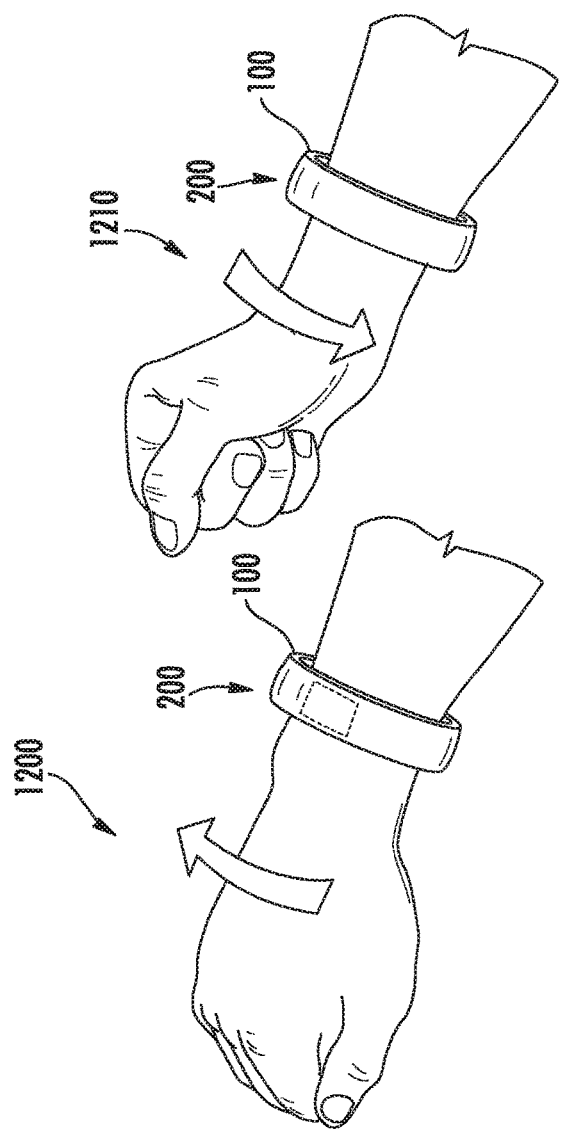

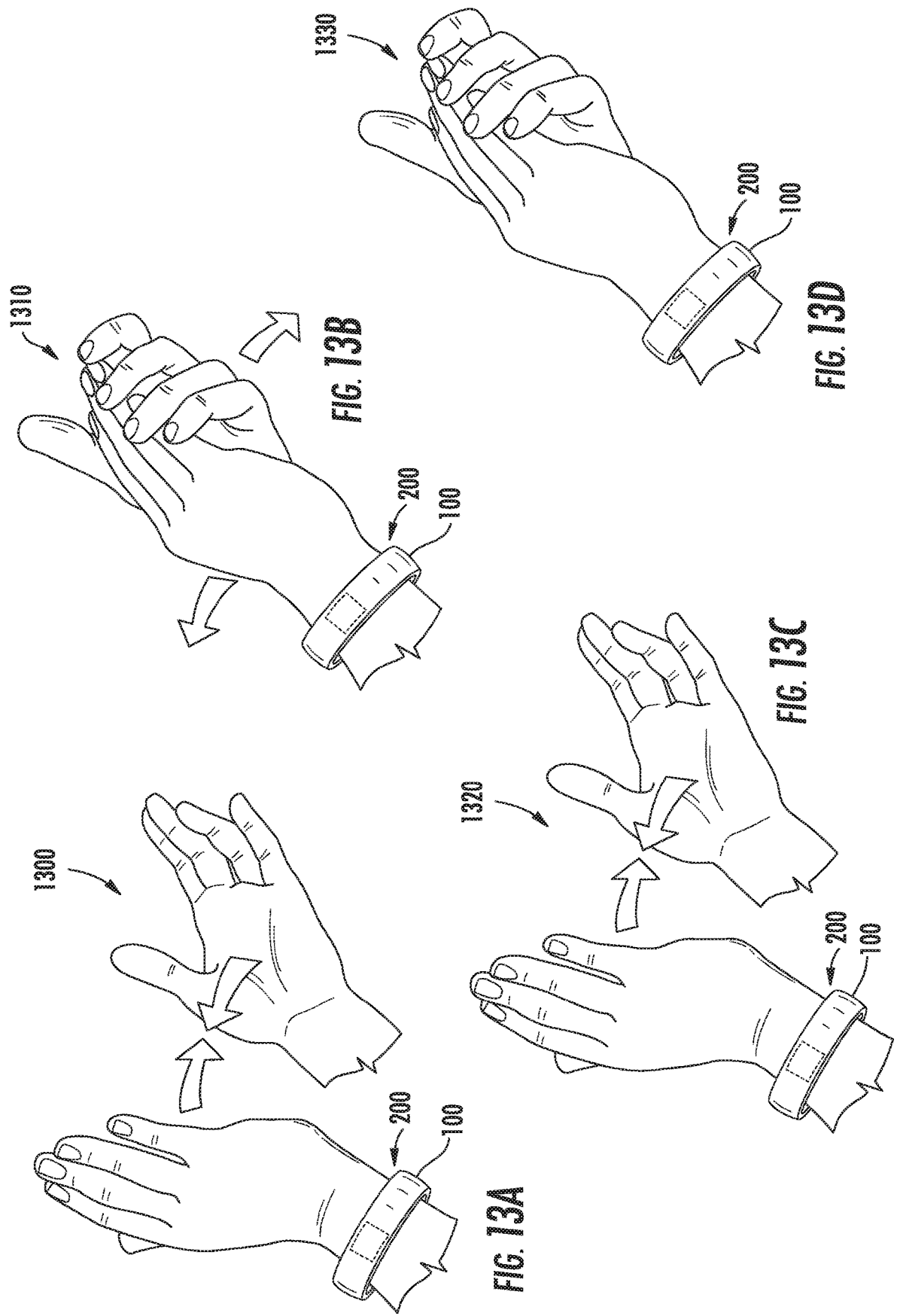

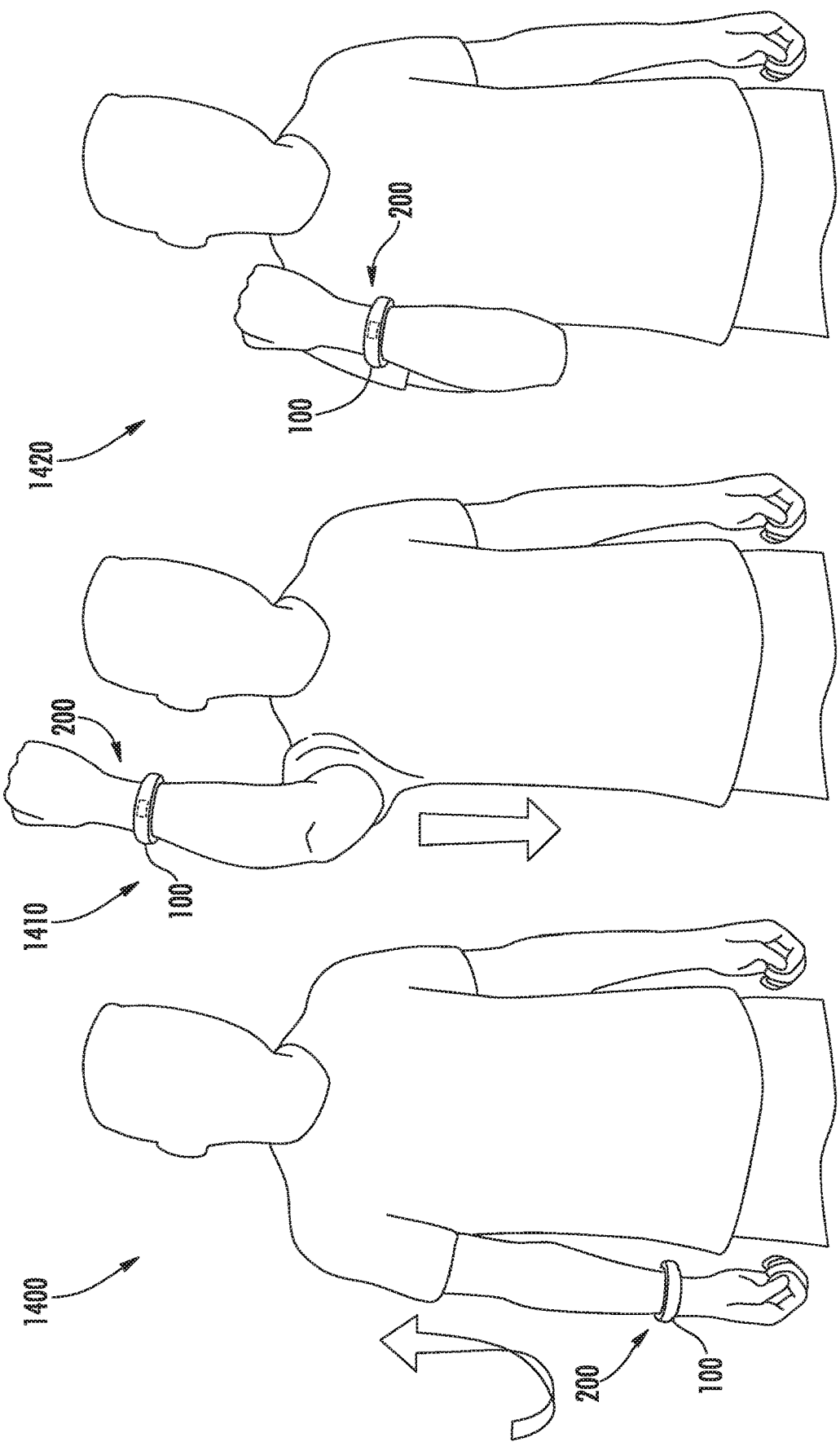

TECHNOLOGIES FOR MICRO-MOTION-BASED INPUT GESTURE CONTROL OF WEARABLE COMPUTING DEVICES

CROSS REFERENCE TO RELATED APPLICATIONS

The present application claims priority to and is a national stage entry under 35 USC § 371(b) of International Application No. PCT/CN2015/082551, which was filed Jun. 26, 2015, entitled "TECHNOLOGIES FOR MICRO-MOTION-BASED INPUT GESTURE CONTROL OF WEARABLE COMPUTING DEVICES."

BACKGROUND

Mobile computing devices have become important tools for personal, business, and social uses. As technological advancements have made the size of mobile computing devices smaller and increased their processing power, some mobile computing devices may be sized to be hand-held and/or worn by a user. Such user-worn mobile computing devices may be used to perform various functions such as, for example, monitoring biometrics of the wearer (e.g., a biometric feedback device), tracking physical activities of the wearer (e.g., a fitness tracker device), and/or tracking a location of the device (e.g., a Global Positioning System (GPS) navigation device). Accordingly, certain user-worn mobile computing devices may be configured to be worn on a specific location or worn around a particular body part of the user, such as a wrist of the user.

Typically, modern user-worn mobile computing devices are in continuous interaction with the user (e.g., constantly gathering sensor supplied data) such that there is no need to turn the device on or off. For user-directed interactions, the user-worn mobile computing devices may include one or more physical user interfacing devices, such as a display, buttons, etc. However, such physical user interfacing devices may be power and/or processor intensive and, under certain conditions, interacting with such physical user interfacing devices may be cumbersome for the wearer. Accordingly, such user-worn mobile computing devices may be additionally or alternatively configured to receive gesture input using data from various sensors of the user-worn mobile computing devices to detect specific gestures from the wearer.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 5 is an illustrative embodiment of a micro-motion state table with corresponding possible values that may be detected by various sensors of the wrist-wearable computing device of FIG. 1;

FIG. 6 is an illustrative embodiment of an input gesture model that includes acceptable input values corresponding to each micro-motion of the input gesture model that may be detected by the various sensors of the wrist-wearable computing device of FIG. 1;

FIG. 7 is an illustrative embodiment of a gesture sequence of detected gesture steps that includes received micro-motion values for various micro-motion states of each gesture step in the illustrative gesture sequence;

FIG. 8 is another illustrative embodiment of a gesture sequence of detected gesture steps that includes received micro-motion values for various micro-motion states of each gesture step in the illustrative gesture sequence;

FIGS. 12A-12C are simplified illustrations of a wrist rotation back-and-forth input gesture that may be performed by the user wearing the wrist-wearable computing device of FIG. 1;

FIGS. 13A-13D are simplified illustrations of a double hand clap input gesture that may be performed by the user wearing the wrist-wearable computing device of FIG. 1; and FIGS. 14A-14C are simplified illustrations of a celebration input gesture that may be performed by the user wearing the wrist-wearable computing device of FIG. 1.

DETAILED DESCRIPTION OF THE DRAWINGS

Figure 1:
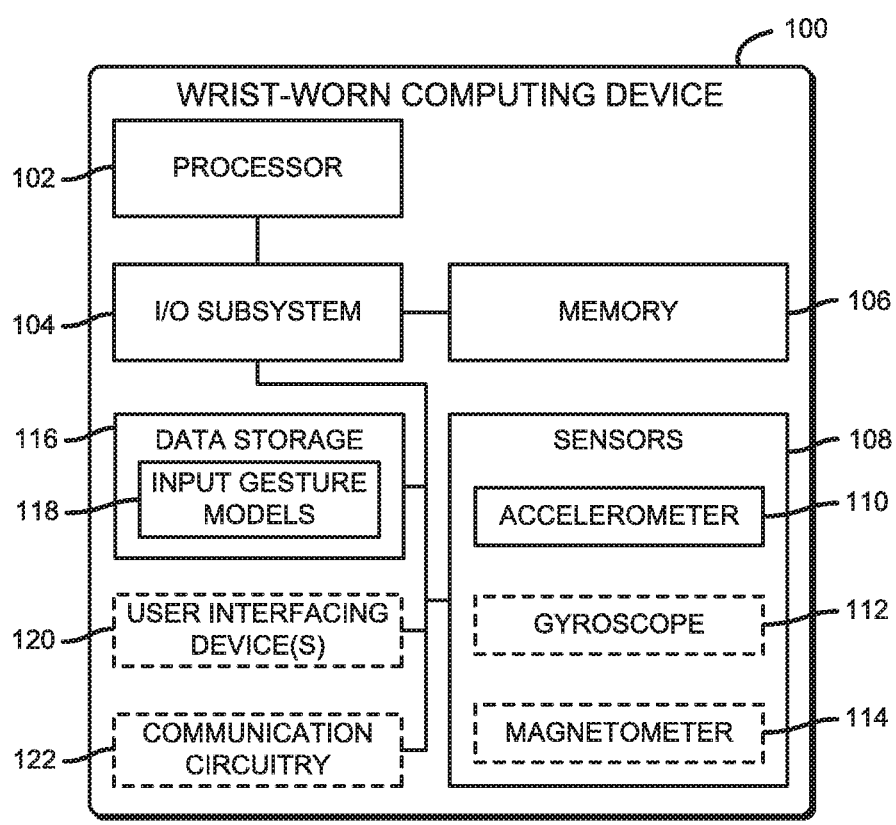
FIG. 1 is a simplified block diagram of at least one embodiment of a wrist-wearable computing device for micro-motion based input gesture control.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a wrist-wearable computing device 100 is configured to detect micro-motion based input gestures. Micro-motions are motion-related characteristics (e.g., movement, orientation, impact, etc.) of the wrist-wearable computing device 100 that may be detected using various hardware and/or software based sensors of the wrist-wearable computing device 100 and, when combined, can define a gesture of the wrist-wearable computing device 100 (i.e., the individual micro-motions are components of the overall gesture). In use, as described in detail below, the wrist-wearable computing device 100 detects a micro-motion and compares the detected micro-motion to a number of input gesture models that each defines an input gesture. Each input gesture model is comprised of a number of required gesture steps, or a gesture sequence, that are defined by a group of micro-motions and acceptable values for each of the micro-motions, which if performed and detected in a predetermined order, results in an input gesture being detected. Consequently, the input gesture may drive an action or event of the wrist-wearable computing device 100, such as by a presently executing application having a predefined action mapped to the detected input gesture.

Figure 2:
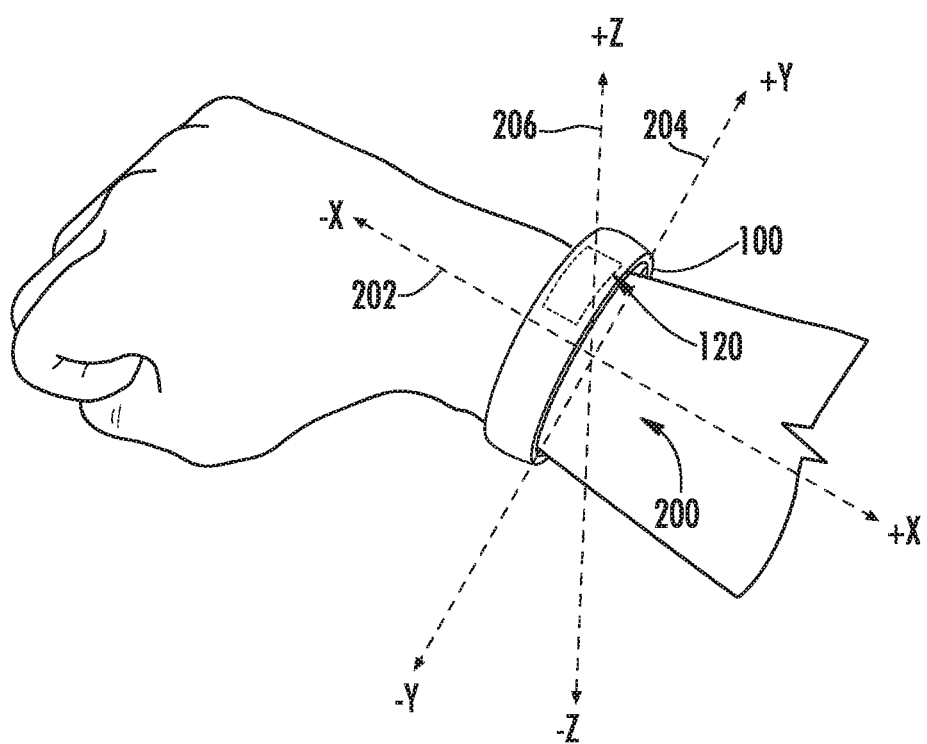
FIG. 2 is a simplified illustration of at least one embodiment of the wrist-wearable computing device of FIG. 1 worn on the forearm or wrist of a user.

In some embodiments, the wrist-wearable computing device 100 may be embodied as any type of mobile computing device capable of being worn on or around a wrist and/or forearm of a user and performing the various functions described herein including, but not limited to, a wrist-wearable computing device, a smart watch, a wrist-wearable consumer electronic device, or any other type of computing device capable of being worn on or around the wrist and/or forearm of the user. For example, in some embodiments, the wrist-wearable computing device 100 may be embodied as smart bracelet as shown in FIG. 2, illustratively being worn on a wrist 200 of the user. Of course, to accommodate the wearing of the wrist-wearable computing device 100 on the wrist 200, the wrist-wearable computing device 100 may be in the shape of a bracelet, a wristwatch, or any other object including an aperture configured to receive the wrist, forearm, or any other portion of the user's body. In some embodiments, the wrist-wearable computing device 100 may be housed in a ring or other type of enclosure configured to be worn around the wrist 200.

In use, the user may interact with the wrist-wearable computing device 100 to control one or more aspects and/or characteristics of the wrist-wearable computing device 100. To do so, the user may move their arm or perform another bodily action that impacts a position or movement of the wrist 200 relative to a previous position of the wrist. For example, the user may raise/lower, extend/retract, or rotate their wrist 200, forearm, hand, etc. in such a way that the orientation or position of the wrist-wearable computing device 100 is changed (i.e., moved relative to the user's wrist 200). Each movement of the wrist-wearable computing device 100 is translated into a number of micro-motion states determined, illustratively, based on a three-dimension axis that includes an x-axis 202, a y-axis 204, and a z-axis, to determine 'x', 'y', and 'z' coordinates (i.e., three-dimension axis data) as shown in FIG. 2. Additionally, the movement of the wrist-wearable computing device 100 may be determined using the various sensors of the wrist-wearable computing device 100.

Referring again to FIG. 1, the illustrative wrist-wearable computing device 100 includes a processor 102, an input/output (I/O) subsystem 104, a memory 106, a number of sensors 108, and data storage 116. Of course, in other embodiments, the wrist-wearable computing device 100 may include alternative or additional components, such as those commonly found in a server, router, switch, or other network device. Additionally, in some embodiments, one or more of the illustrative components may be incorporated in, or otherwise form a portion of, another component. For example, the memory 106, or portions thereof, may be incorporated in one or more processors 102 in some embodiments.

The processor 102 may be embodied as any type of processor capable of performing the functions described herein. The processor 102 may be embodied as a single or multi-core processor(s), digital signal processor, microcontroller, or other processor or processing/controlling circuit. The memory 106 may be embodied as any type of volatile or non-volatile memory or data storage capable of performing the functions described herein. In operation, the memory 106 may store various data and software used during operation of the wrist-wearable computing device 100, such as operating systems, applications, programs, libraries, and drivers. The memory 106 is communicatively coupled to the processor 102 via the I/O subsystem 104, which may be embodied as circuitry and/or components to facilitate input/output operations with the processor 102, the memory 106, and other components of the wrist-wearable computing device 100. For example, the I/O subsystem 104 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 104 may form a portion of a system-on-a-chip (SoC) and be incorporated, along with the processors 102, the memory 106, and other components of the wrist-wearable computing device 100, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 106 may store various other data useful during the operation of the wrist-wearable computing device 100. Additionally, the illustrative data storage 116 includes a number of input gesture models 118 for matching detected micro-motion states to input gestures. As discussed in more detail below, each input gesture model in the input gesture models 118 is defined by a gesture sequence of separate gesture steps with corresponding micro-motion states and acceptable values (see, e.g., FIG. 6) for each micro-motion state at each gesture step in the gesture sequence. As such, the wrist-wearable computing device 100 may detect an input gesture when each gesture step of a particular input gesture model in the input gesture models 118 is performed in corresponding gesture sequence.

Unlike traditional mobile computing device gesture detection models (e.g., Hidden Markov Model (HMM), Dynamic Time Warping (DTW), Finite State Machine (FSM)), which can be heavy in computation (e.g., HMM), large in model size (e.g., DTW), or non-extendable in vocabulary (e.g., FSM), the illustrative input gesture models 118 do not use abstract features (e.g., maximum, minimum, zero cross rate, etc.) to perform the calculations, but rather rely on physical meaning of micro-motions of the user's wrist 200 (e.g., movement, rotation, orientation, impact, etc.) from which input gestures can be detected. Accordingly, the size of each input gesture model, and as a result, the input gesture models 118 collectively (i.e., the gesture vocabulary), may be smaller than the HMM and DTW. Furthermore, the gesture vocabulary can be adjusted and/or extended by editing or adding one or more of the input gesture models 118. It should be appreciated that the particular input gesture models 118 may vary depending on the particular embodiment.

As shown in FIG. 1, the wrist-wearable computing device 100 also includes one or more sensors 108 configured to collect data (i.e., signals) associated with the acceleration, orientation, and/or other inertial characteristics of the wrist-wearable computing device 100. Of course, in some embodiments, the sensors 108 may collect other data that may be used by the wrist-wearable computing device 100 in performing the functions described herein and/or other functions of the wrist-wearable computing device 100. Accordingly, in various embodiments, the sensors 108 may be embodied as, or otherwise include, for example, biometric sensors, proximity sensors, optical sensors, light sensors, audio sensors, temperature sensors, motion sensors, piezo-electric sensors, location sensors, and/or other types of sensors capable of performing the functions described herein. Of course, the wrist-wearable computing device 100 may also include additional components and/or devices configured to facilitate the use of the sensor(s) 122 (e.g., to collect and/or condition the sensed signals).

In the illustrative embodiment, the sensors 108 include an accelerometer 110, a gyroscope 112, and/or a magnetometer 114 to determine the rotation, impact, orientation, and movement of the wrist-wearable computing device 100 relative to the wrist 200. Of course, it should be appreciated that in some embodiments, the sensors 108 may include multiple accelerometers, gyroscopes, and/or magnetometers, and/or other sensors, such as a software gyroscope sensor configured to calculate an angular velocity of the wrist-wearable computing device 100 based on input from the accelerometer 110 and the magnetometer 114. The accelerometer 110 may be embodied as any sensor, circuitry, and/or other components configured to measure acceleration and/or other motion of the wrist-wearable computing device 100 (e.g., along each of the three-dimensional axes of the wrist-wearable computing device 100). The gyroscope 112 may be embodied as any sensor, circuitry, and/or other components configured to measure the angular orientation of the wrist-wearable computing device 100 relative to a predefined coordinate system. That is, the gyroscope 112 may measure the roll, pitch, and/or yaw of the wrist-wearable computing device 100. The magnetometer 114 may be embodied as any sensor, circuitry, and/or other components configured to measure the magnetic field (e.g., a compass) and/or other information useful in determining the direction in which the wrist-wearable computing device 100 is pointing (e.g., with respect to due North). Of course, the wrist-wearable computing device 100 may also include components and/or devices configured to facilitate the use of the sensors 108 (e.g., an inertial measurement unit).

In some embodiments, the wrist-wearable computing device 100 may additionally include one or more user interfacing devices 120. The user interfacing devices 120 may be embodied as any type of device or devices configured to receive input from a user and/or provide output to the user via a physical user interfacing device, such as a button, a display (e.g., liquid crystal display (LCD), organic light emitting diode (OLED)), a touchscreen (e.g., capacitive, infrared, optical, resistive, etc.), an adjustable knob, an adjustable slider, a switch, a light (e.g., a light emitting diode (LED)), a camera, a microphone, a speaker, and/or any other type of device capable of receiving user input and/or providing output to the user.

In some embodiments, the wrist-wearable computing device 100 may additionally include communication circuitry 122. The communication circuitry 122 may be embodied as any communication circuit, device, or collection thereof, capable of enabling communications between the wrist-wearable computing device 100 and other remote devices over a network (not shown). The communication circuitry 122 may be configured to use any one or more communication technologies (e.g., wireless or wired communications) and associated protocols (e.g., Ethernet, Bluetooth®, Wi-Fi®, WiMAX, etc.) to effect such communication.

Figure 3:
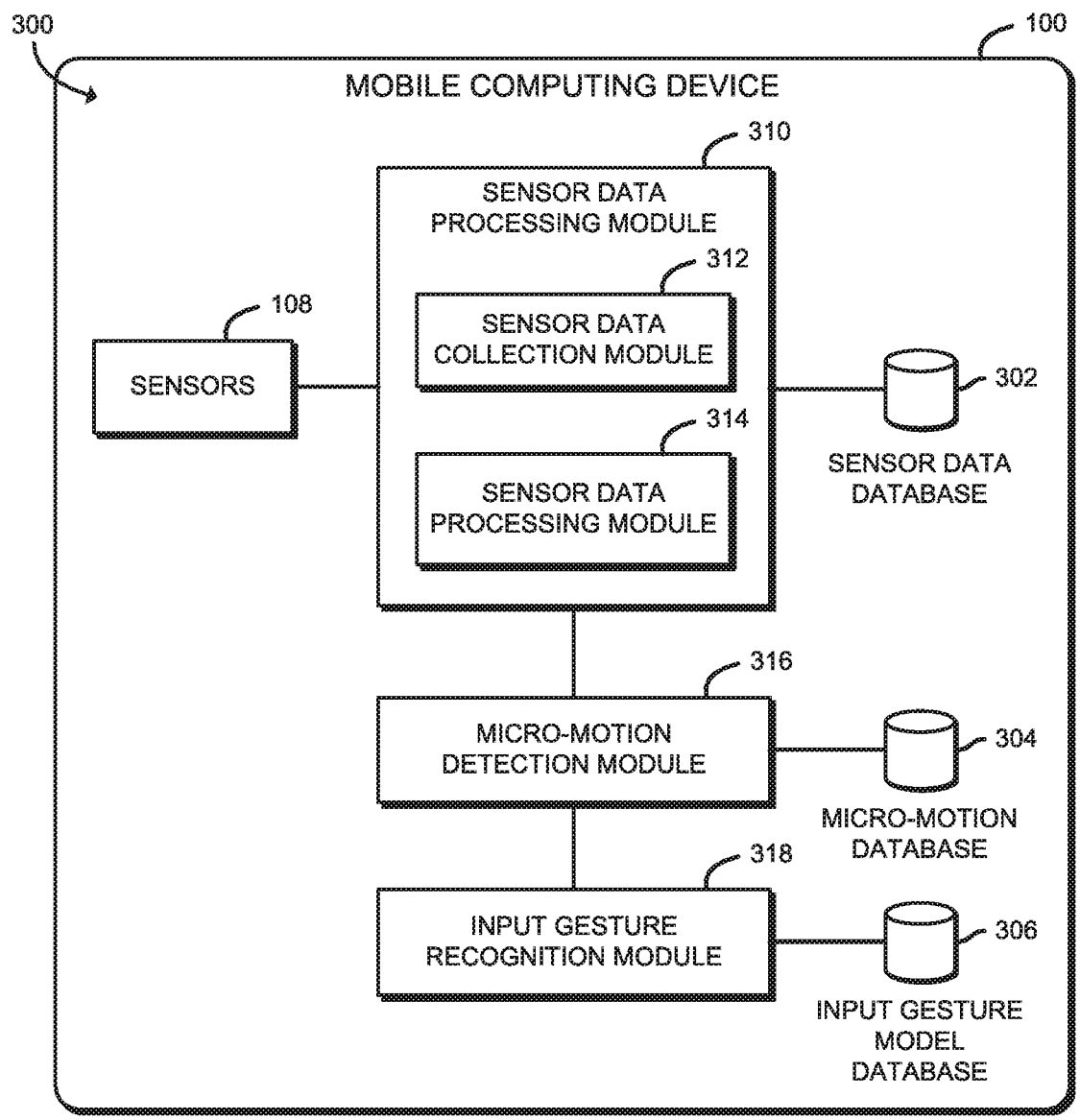
FIG. 3 is a simplified block diagram of at least one embodiment of an environment of the wrist-wearable computing device of FIG. 1.

Referring now to FIG. 3, in use, the wrist-wearable computing device 100 establishes an environment 300 for detecting input gestures. The illustrative environment 300 of the wrist-wearable computing device 100 includes a sensor data processing module 310, a micro-motion detection module 316, and an input gesture recognition module 318. Additionally, the illustrative environment 300 includes a sensor data database 302, a micro-motion database 304, and an input gesture model database 306, each of which may be accessed by one or more of the modules and/or sub-modules of the illustrative environment 300.

Each of the modules, logic, and other components of the environment 300 may be embodied as hardware, software, firmware, or a combination thereof. For example, each of the modules, logic, and other components of the environment 300 may form a portion of, or otherwise be established by, the processor 102 or other hardware components of the wrist-wearable computing device 100. As such, in some embodiments, one or more of the modules of the environment 300 may be embodied as a circuit or collection of electrical devices (e.g., a sensor data processing circuit, an input gesture recognition circuit, a micro-motion detection circuit, etc.). It should be appreciated that the wrist-wearable computing device 100 may include other components, sub-components, modules, sub-modules, and devices commonly found in a computing device, which are not illustrated in FIG. 3 for clarity of the description. Additionally, in some embodiments, one or more of the illustrative modules may be an independent module or form a portion of another module.

The sensor data processing module 310 is configured to process sensor data captured by the sensors 108 and determine a present rotation, movement, direction, orientation, and/or other gesture aspect of the wrist-wearable computing device 100 relative to previously determined position of the wrist-wearable computing device 100. In particular, the sensor data processing module 310 includes a sensor data collection module 312 to collect sensor data signals captured by one or more of the sensors 108 and a sensor data processing module 314 to process the collected sensor data signals. In some embodiments, the sensor data collection module 312 may be configured to store the collected sensor data signals in a sensor data database 302. Additionally, in some embodiments, the sensor data processing module 314 may be configured to process or otherwise condition the sensor data signals by amplifying, filtering, isolating, exciting, quantizing, linearizing, converting, or otherwise manipulating the sensor data signals for further processing. For example, in some embodiments, the sensor data processing module 314 may include filters to reduce high frequency noise. In some embodiments, the sensor data processing module 314 may be configured to store the processed sensor data signals in the sensor data database 302.

The micro-motion detection module 316 is configured to recognize micro-motions based on the sensor data signals, such as the processed sensor data signals stored in the sensor data database and add the micro-motions as a step to a sequence of detected steps to the input gesture models (e.g., the input gesture models 118). For example, the micro-motion detection module 316 may be configured to determine a micro-motion based on the sensor data signals provided by the accelerometer 110, the gyroscope 112, and/or the magnetometer 114. To do so, the micro-motion detection module 316 may be configured to compare the sensor data signals to a set of predetermined micro-motions, which may be stored in the micro-motion database 304, in some embodiments. For example, in the illustrative embodiment of the micro-motion state table 500 of FIG. 5, the micro-motion state table 500 includes various micro-motion states 502 and corresponding acceptable values 504 that may be determined for each of the micro-motion states 502 based on the sensor data signals. It should be appreciated that the acceptable values 504 may be defined as numerical values (e.g., a numerical value indicative of orientation or motion) or qualitative values (e.g., "slow move," "fast move," etc.) based on underlying numerical values. In some embodiments, the micro-motion state table 500 may be stored in the micro-motion database 304.

The illustrative micro-motion state table 500 includes a motion micro-motion state 506, an orientation micro-motion state 508, a rotation-x micro-motion state 510, a rotation-y micro-motion state 512, a rotation-z micro-motion state 514, a linear motion-x micro-motion state 516, a linear motion-y micro-motion state 518, a linear motion-z micro-motion state 520, an impact micro-motion state 522, and a shaking micro-motion state 524. The motion micro-motion state 506 includes three possible motion state values, including: still (i.e., generally no motion), a slow move, and a fast move. The orientation micro-motion state 508 includes seven possible orientation state values, including: a positive X orientation state, a positive Y orientation state, a positive Z orientation state, a negative X orientation state, a negative Y orientation state, a negative Z orientation state, and an unknown orientation state.

The rotation-x micro-motion state 510 includes three possible rotation values, including: slow, fast, and none. The slow and fast values may be a positive or negative value (e.g., slow in the negative X direction along the x-axis 202, or fast in the positive X direction along the x-axis 202, etc.), based on the rotation of the wrist-wearable computing device 100 relative to the x-axis 202. The rotation-y micro-motion state 512 includes three possible values, including: slow, fast, and none. The slow and fast values may be a positive or negative value (e.g., slow in the negative Y direction along the y-axis 204, or fast in the positive Y direction along the y-axis 204, etc.), based on the rotation of the wrist-wearable computing device 100 relative to the y-axis 204. The rotation-z micro-motion state 514 includes three possible values, including: slow, fast, and none. The slow and fast values may be a positive or negative value (e.g., slow in the negative Z direction along the z-axis 206, or fast in the positive Z direction along the along the z-axis 206, etc.), based on the rotation of the wrist-wearable computing device 100 relative to the z-axis 206.

The linear motion-x micro-motion state 516 includes three possible values, including: a positive X linear motion, a negative X linear motion, and none (e.g., no linear motion relative to the x-axis 202). The linear motion-y micro-motion state 518 includes three possible values, including: a positive Y linear motion, a negative Y linear motion, and none (e.g., no linear motion relative to the y-axis 204). The linear motion-z micro-motion state 520 includes three possible values, including: a positive Z linear motion, a negative Z linear motion, and none (e.g., no linear motion relative to the z-axis 206). The impact micro-motion state 522 includes three possible values, including: none, small, and large. The shaking micro-motion state 524 includes two possible values, including: yes (i.e., shaking) and no (i.e., not shaking).

Referring again to FIG. 3, the micro-motion detection module 316 may determine the values of the micro-motion states based on a number of predetermined thresholds. It should be appreciated that, in some embodiments, one or more of the number of thresholds may be changed over time, such as based on analysis of historical micro-motion states and the results thereof. For example, in some embodiments, the micro-motion detection module 316 may determine the motion micro-motion state 506 based on a number of standard deviations of acceleration data across the three-axes captured within a predetermined window of time (e.g., 0.1 seconds). In such an embodiment, the micro-motion detection module 316 may determine the motion micro-motion state 506 to be still if the number of standard deviations is less than 40 mg (i.e., wherein g is the gravitational acceleration). Further, the micro-motion detection module 316 may determine the motion micro-motion state 506 to be a slow move if the number of standard deviations is greater than 60 mg and less than 300 mg, and a fast move if the number of standard deviations is greater than or equal to 300 mg.

Similarly, in some embodiments, the micro-motion detection module 316 may determine the orientation micro-motion state 508 based on the three-axis acceleration data. For example, the micro-motion detection module 316 may determine the orientation micro-motion state 508 based on which axis has the maximum absolute value when the motion micro-motion state 506 is equal to still or slow move and determine that the orientation micro-motion state 508 is unknown if the motion micro-motion state 506 is equal to fast move. Additionally or alternatively, in some embodiments, the micro-motion detection module 316 may determine rotation micro-motion states (i.e., the rotation-x micro-motion state 510, the rotation-y micro-motion state 512, and the rotation-z micro-motion state 514) based on an integration of the three-axis gyro data, calculated or sensed, captured within a predetermined window of time (e.g., 0.2 seconds). In such an embodiment, the micro-motion detection module 316 may determine a rotation micro-motion state to be equal to no rotation if an absolute value of the integration is less than 5 degrees per second, equal to a slow rotation if the absolute value of the integration is greater than or equal to 5 degrees per second and less than 10 degrees per second, and equal to a fast rotation if the absolute value of the integration is greater than or equal to 10 degrees per second.

Additionally or alternatively, in some embodiments, the micro-motion detection module 316 may determine linear micro-motion states (i.e., the linear motion-x micro-motion state 516, the linear motion-y micro-motion state 518, the linear motion-z micro-motion state 520) based on an integration of the three-axis acceleration, with the mean removed, captured within a predetermined window of time (e.g., 0.1 seconds). In such embodiments, the micro-motion detection module 316 may determine a linear micro-motion state to be equal to no linear motion if the absolute value of the integration is less than 70 mg (i.e., wherein g is the gravitational acceleration) and equal to a linear motion if the absolute value of the integration is greater than or equal to 70 mg.

In some embodiments, the micro-motion detection module 316 may additionally or alternatively determine the impact micro-motion state 522 based on a standard deviation of acceleration magnitude captured within a predetermined window of time (e.g., 0.05 seconds). In such embodiments, the micro-motion detection module 316 may determine the impact micro-motion state 522 to be equal to no impact if the standard deviation is less than 200 mg (i.e., wherein g is the gravitational acceleration), equal to a small impact if the standard deviation is greater than 300 mg and less than or equal to 1000 mg, and equal to a large impact if the standard deviation is greater than 1000 mg.

Additionally or alternatively, in some embodiments, the micro-motion detection module 316 may determine the shaking micro-motion state 524 based on a number of gravity cross-counts of acceleration magnitude captured within a predetermined window of time (e.g., 0.5 seconds). In such embodiments, the micro-motion detection module 316 may determine the shaking micro-motion state 524 to be not shaking if the number of gravity cross-counts is less than eight and shaking if the number of gravity cross-counts is greater than or equal to eight.

Referring back to FIG. 3, the input gesture recognition module 318 is configured to detect input gestures based on the detected micro-motions. To do so, the input gesture recognition module 318 is configured to compare a gesture sequence of detected gesture steps to the required gesture steps of the input gesture models (e.g., the input gesture models 118). As described above, each gesture step in the gesture sequence of an input gesture model is embodied as a number of micro-motions and associated acceptable values (e.g., values interpreted from the sensor data signals) In other words, each input gesture model is embodied as a gesture sequence of gesture steps that are predefined for each input gesture and each gesture step includes the acceptable values for the micro-motions that make up or define that particular gesture step in the corresponding input gesture.

Accordingly, to detect input gestures, the input gesture recognition module 318 determines whether each gesture step in a particular input gesture model of the input gesture models 118 is performed in sequence based on the detected micro-motions.

For example, referring now to FIG. 6, an illustrative embodiment of a finger-snap input gesture model 600, which will be described in further detail below, for a finger-snap input gesture (see FIGS. 9A-9C) includes a sequence of required gesture steps 602 consisting of six gesture steps 604-614 (i.e., a first gesture step 604, a second gesture step 606, a third gesture step 608, a fourth gesture step 610, a fifth gesture step 612, and a sixth gesture step 614). Each gesture step of the finger-snap input gesture model 600 is defined by a number of micro-motion states 502 and corresponding acceptable values for that gesture step. As such, the input gesture recognition module 318 may detect the finger-snap gesture upon the determination that the values for each micro-motion state 502 for each of the gesture steps match the finger-snap input gesture model 600. Upon detection of an input gesture, the input gesture recognition module 318 may provide an indication to a software application presently executing on the wrist-wearable computing device 100, such as via an application program interface (API). Accordingly, the software application may perform a desired task based on the indication.

For example, the first gesture step 604 (i.e., gesture step 1), requires: the motion micro-motion state 506 to be still (i.e., no motion); the orientation micro-motion state 508 to be one of a positive Z orientation, a negative X orientation, or a negative Y orientation; the rotation-x micro-motion state 510 to be none (i.e., no rotation along the x-axis 202); the linear motion-x micro-motion state 516, the linear motion-y micro-motion state 518, and the linear motion-z micro-motion state 520 to be none (i.e., no linear motion); the impact micro-motion state 522 to be none; and the shaking micro-motion state 524 to be no (i.e., not shaking). Additionally, the rotation-y micro-motion state 512 and the rotation-z micro-motion state 514 are not applicable to the first step 604. In other words, the values corresponding to the rotation-y micro-motion state 512 and the rotation-z micro-motion state 514 do not matter for the first gesture step 604.

It should be appreciated that different input gestures may have fewer or additional gesture steps, may include additional, fewer, or alternative corresponding acceptable values. It should be further appreciated that, in some embodiments, the micro-motion states of other input gesture models may include additional or alternative micro-motion states. For example, the illustrative finger-snap input gesture model 600 includes a maximum delta time 616 as an additional micro-motion state to indicate a maximum amount of time (i.e., a duration of time threshold) that may elapse between steps.

Figure 4:
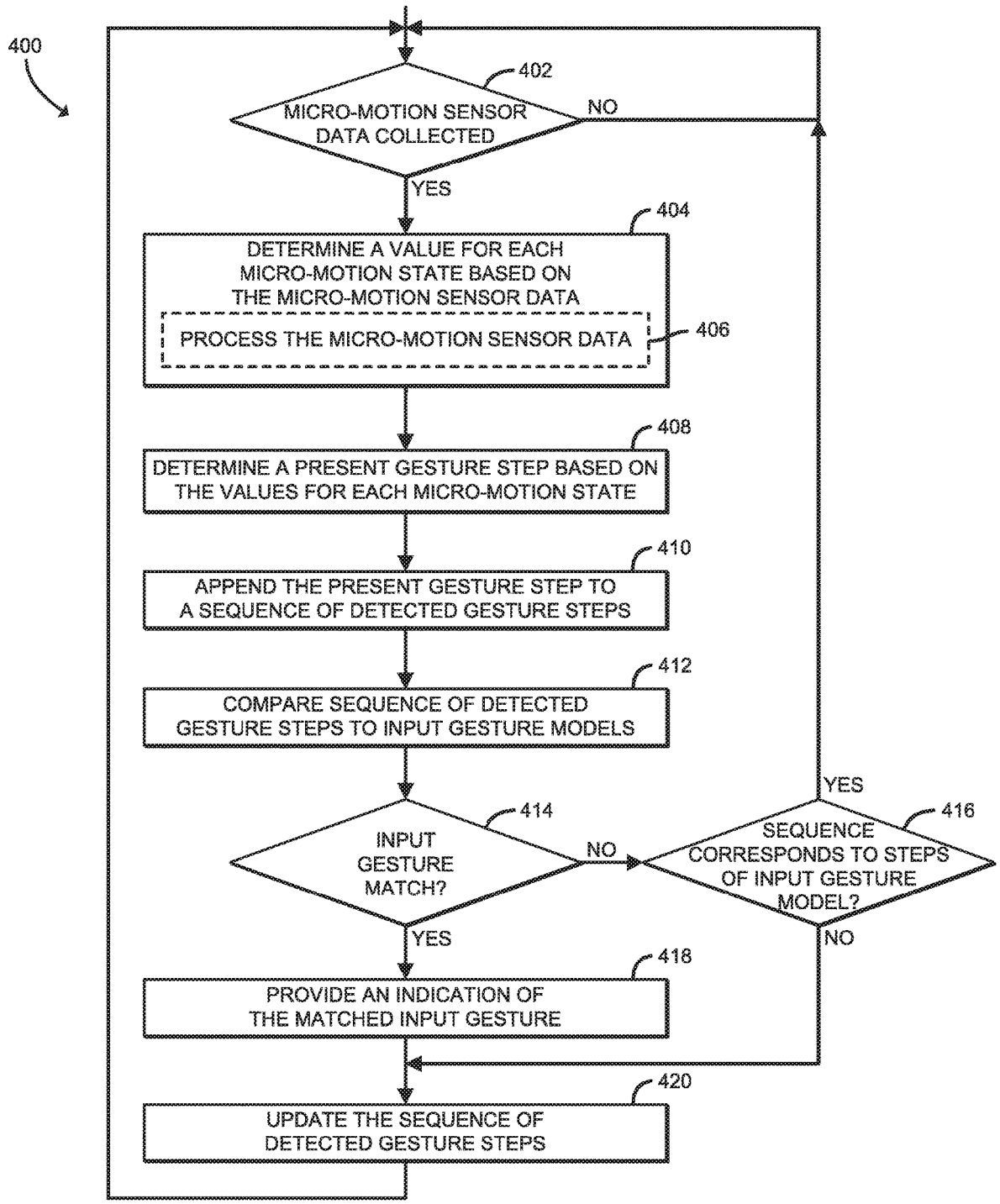
FIG. 4 is a simplified flow diagram of at least one embodiment of a method for controlling a wrist-wearable computing device using micro-motion-based input gestures that may be executed by the wrist-wearable computing device of FIG. 1.

Referring now to FIG. 4, in use, the wrist-wearable computing device 100 may execute a method 400 for detecting micro-motion based input gestures. The illustrative method 400 begins with block 402 of FIG. 4, in which the wrist-wearable computing device 100 determines whether any micro-motion related sensor data has been received. In other words, the wrist-wearable computing device 100 determines whether sensor data (i.e., sensor data signals) corresponding to the micro-motions was sensed by the sensors 108 (e.g., the accelerometer 110, the gyroscope 112, the magnetometer 114, etc.) and collected by the wrist-wearable computing device 100 for processing. In some embodiments, the micro-motion related sensor data may be collected at a predetermined time interval, such as may be triggered by a timer. Additionally or alternatively, in some embodiments, the micro-motion related sensor data may be collected upon the occurrence of an event (i.e., event-driven), such as by a micro-motion having been detected. If no micro-motion related sensor was collected, the method 400 loops back to block 402 to continue monitoring for received micro-motion related sensor data; otherwise, the method 400 advances to block 404.

At block 404, the wrist-wearable computing device 100 determines a value for each micro-motion state based on the collected micro-motion sensor data. In some embodiments, to determine the values, the wrist-wearable computing device 100 may process or otherwise condition the micro-motion data signals at block 406 by amplifying, filtering, converting, isolating, and/or applying any other signal conditioning method to generate micro-motion state values from the micro-motion sensor data. In such embodiments, for example, the wrist-wearable computing device 100 may process the micro-motion sensor data received from the accelerometer 110, the gyroscope 112, and/or the magnetometer 114. At block 408, the wrist-wearable computing device 100 determines a present gesture step based on the values determined for each micro-motion state at block 404.

At block 410, the wrist-wearable computing device 100 appends the present gesture step determined at block 408 to a sequence of detected gesture steps. For example, referring now to FIG. 7, in an illustrative embodiment of a gesture sequence of detected gesture steps 700 that includes three gesture steps 702-706, the third gesture step 706 corresponds to the present gesture step added to the gesture sequence of detected gesture steps 700, as indicated by the highlighted rectangle surrounding the third gesture step 706.

Referring back to FIG. 4, at block 412, the wrist-wearable computing device 100 compares the sequence of detected gesture steps to each of the input gesture models 118. At block 414, the wrist-wearable computing device 100 determines whether the comparison resulted in an input gesture match. In other words, the wrist-wearable computing device 100 determines whether the gesture steps and corresponding micro-motion values for the micro-motion states of the gesture sequence of detected gesture steps matches the gesture steps and corresponding acceptable micro-motion values for the micro-motion states of any of the input gesture models 118.

For example and as described above, in the illustrative finger-snap input gesture model 600 of FIG. 6, an input gesture may be detected when each of the six gesture steps 604-614 is performed in the sequential order defined by the finger-snap input gesture model 600 (i.e., the sequence of required gesture steps 602). Accordingly, for example, the wrist-wearable computing device 100 may compare the sequence of detected gesture steps 700 of FIG. 7 (i.e., the first gesture step 702, the second gesture step 704, and the third gesture step 706) to each input gesture model, which may include the illustrative finger-snap input gesture model 600.

Referring back to FIG. 4, if the wrist-wearable computing device 100 determines at block 414 that there was not an input gesture match, the method 400 advances to block 416. At block 416, the wrist-wearable computing device 100 determines whether the gesture steps and corresponding micro-motion values of the sequence of detected gesture steps matches a portion of at least one of the gesture steps and corresponding acceptable micro-motion values of any of the input gesture models 118. To do so, the wrist-wearable computing device 100 may determine, during the comparison at block 416, whether the sequence of detected gesture steps corresponds to at least the first number of gesture steps (i.e., wherein the first number of gesture steps correspond to the number of detected gesture steps in the sequence of detected steps) of an input gesture model defining a required sequence of required gesture steps.

For example, referring again to FIGS. 6 and 7, the wrist-wearable computing device 100 may compare the sequence of detected gesture steps 700 of FIG. 7, consisting of three gesture steps, to the first three steps of the sequence of required gesture steps 602. In the illustrative sequence of required gesture steps 602 of FIG. 6, the third gesture step 608 (i.e., step 3) requires: the motion micro-motion state 506 to be a fast move motion; the orientation micro-motion state 508 to be unknown; the rotation-x micro-motion state 510 to be a fast rotation along the x-axis 202; the linear motion-x micro-motion state 516, the linear motion-y micro-motion state 518, and the linear motion-z micro-motion state 520 to be none (i.e., no linear motion); the impact micro-motion state 522 to be small or large; and the shaking micro-motion state 524 to be no (i.e., not shaking). Similar to the first gesture step 604, the rotation-y micro-motion state 512 and the rotation-z micro-motion state 514 of the third gesture step 608 are not applicable. Further, the third gesture step 608 has a maximum delta time of 200 milliseconds. In other words, if the amount of time between the second gesture step 606 and the third gesture step 608 (e.g., the maximum delta time 616 of the third gesture step 706 of FIG. 7) exceeds the maximum delta time (e.g., 200 ms), the gesture steps would not match. As shown in FIG. 7, the third gesture step 706 of the gesture sequence of detected gesture steps 700 includes acceptable values for the micro-motion states of the third gesture step 608 of the sequence of required gesture steps 602. Further, each of the first gesture step 702 and the second gesture step 704 of the gesture sequence of detected gesture steps 700 includes acceptable values for the micro-motion states of first gesture step 604 and the second gesture step 606 of the sequence of required gesture steps 602.

Accordingly, referring back to FIG. 4, in such an embodiment wherein each gesture step of the gesture sequence of detected gesture steps includes acceptable values for the micro-motion states of each gesture step of the gesture sequence of required gesture steps of at least one input gesture model 118, the method 400 returns from block 416 to block 402 to continue monitoring for received micro-motion related sensor data. However, if the gesture sequence of detected gesture steps does not include acceptable values for the micro-motion states of each gesture step of the gesture sequence of required gesture steps for any of the input gesture models 118, the method advances to block 420. At block 420, the wrist-wearable computing device 100 updates the gesture sequence of detected gesture steps before returning to block 402 to continue monitoring for received micro-motion related sensor data. For example, in some embodiments, the wrist-wearable computing device 100 may clear the gesture sequence of detected gesture steps, keep only the most recently added gesture step appended at block 410 in the gesture sequence of detected gesture steps, or remove the oldest gesture step in the gesture sequence of detected gesture steps. In such embodiments wherein one or more gesture steps remains in the sequence of detected gesture steps, the method 400 may return to block 412 to perform the comparison of the updated gesture sequence of detected gesture steps to the input gesture models 118.

If the wrist-wearable computing device 100 determines at block 414 that there was an input gesture match, the method 400 advances to block 418 in which the wrist-wearable computing device 100 provides an indication of the matched input gesture. For example, the wrist-wearable computing device may provide an indication of the matched input gesture to an application, such as via an API. Additionally or alternatively, in some embodiments, the wrist-wearable computing device 100 may provide an indication (e.g., a tactile, audible, or visual indication) to the user that the input gesture has been identified.

Referring now to FIG. 8, an illustrative embodiment of a gesture sequence of detected gesture steps 800 includes six gesture steps 802-812 (i.e., a first gesture step 802, a second gesture step 804, a third gesture step 806, a fourth gesture step 808, a fifth gesture step 810, and a sixth gesture step 812). The sixth gesture step 812, as indicated by the highlighted rectangle surrounding the sixth gesture step 812, corresponds to the gesture step which the micro-motion values were appended to the sequence of detected gesture steps 800 at block 410 of FIG. 4. As such, referring again to FIG. 4 at block 416, the wrist-wearable computing device 100 may compare the gesture sequence of detected gesture steps 800 of FIG. 8, consisting of six gesture steps, to all six of the gesture steps of the gesture sequence of required gesture steps 602 in sequential order. As shown in FIGS. 6 and 8, each gesture step of the gesture sequence of detected gesture steps includes acceptable values for the micro-motion states of each gesture step of the gesture sequence of required gesture steps 602. As a result, an input gesture match is detected. Accordingly, referring again to FIG. 4, in such an embodiment, the method 400 advances to block 418 as described above, before advancing to block 420 to update the sequence of detected steps.

Figure 9C:
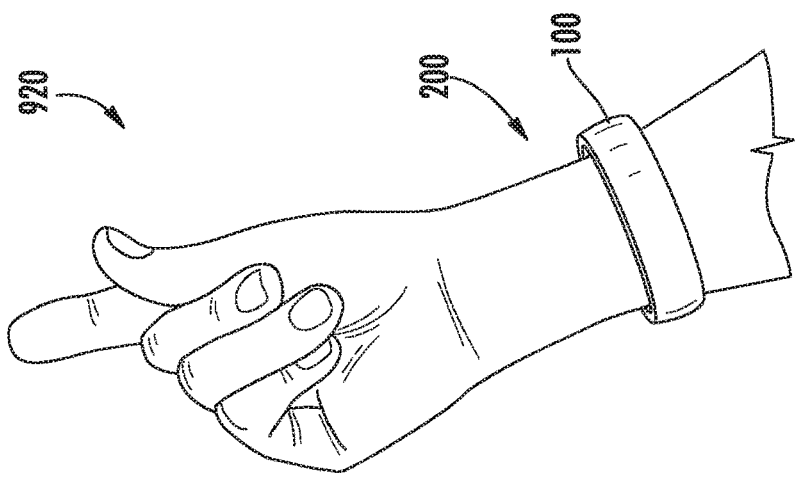
FIGS. 9A-9C are simplified illustrations of a finger-snap input gesture that may be performed by the user wearing the wrist-wearable computing device of FIG. 1.
Figure 9B:
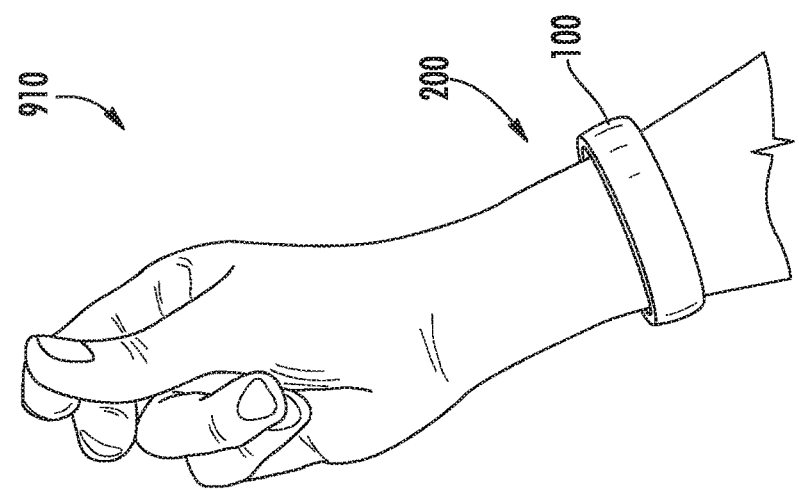
Figure 9A:
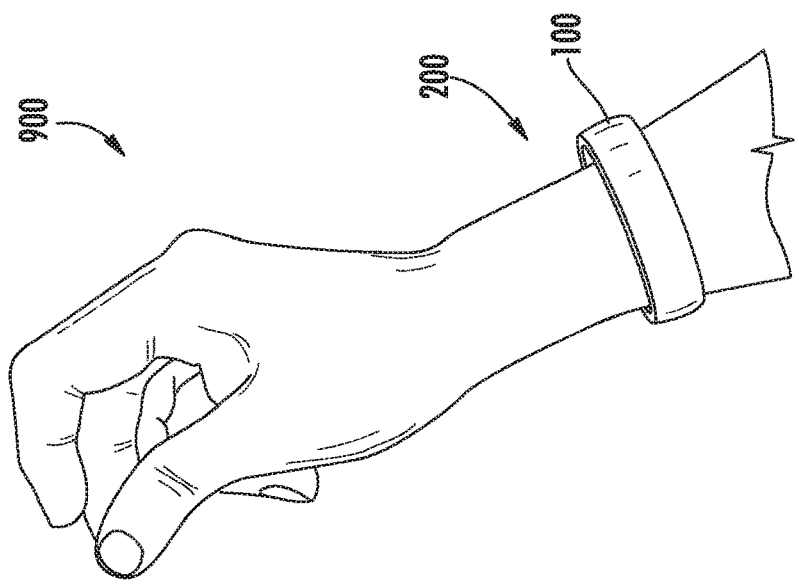

Referring now to FIGS. 9A-9C, an illustrative embodiment of a finger-snap input gesture includes the wrist-wearable computing device 100 being worn on the wrist 200 of the user during the finger-snap input gesture. The illustrative finger-snap input gesture of FIGS. 9A-9C includes a first finger-snap hand orientation 900 shown in FIG. 9A that may be an initial starting hand orientation to execute the finger-snap input gesture, a second finger-snap hand orientation 910 shown in FIG. 9B that may be an intermediate hand orientation during the execution of the finger-snap input gesture, and a third finger-snap hand orientation 920 shown in FIG. 9C that may be a final hand orientation upon completion of the finger-snap input gesture.

Figure 10B:
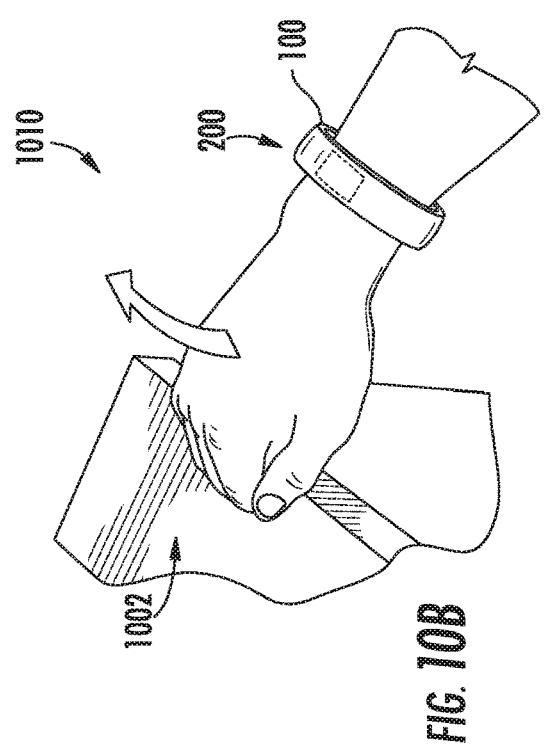
FIGS. 10A-10D are simplified illustrations of a front-hand double-knock input gesture that may be performed by the user wearing the wrist-wearable computing device of FIG. 1.
Figure 10D:
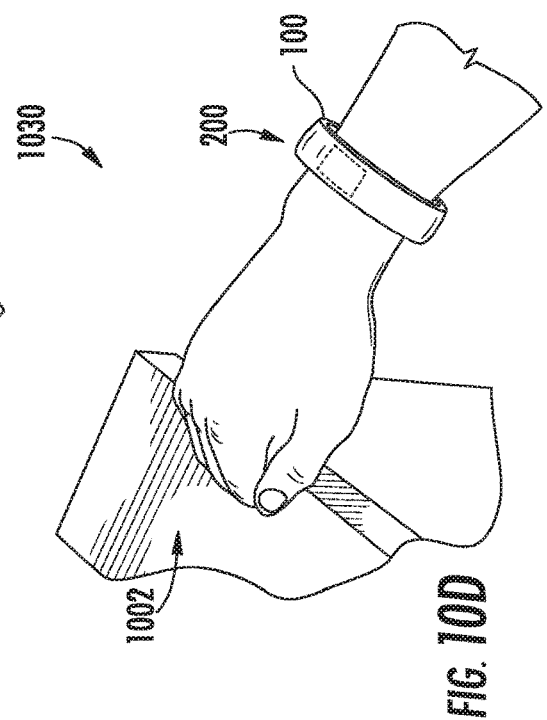
Figure 10A:
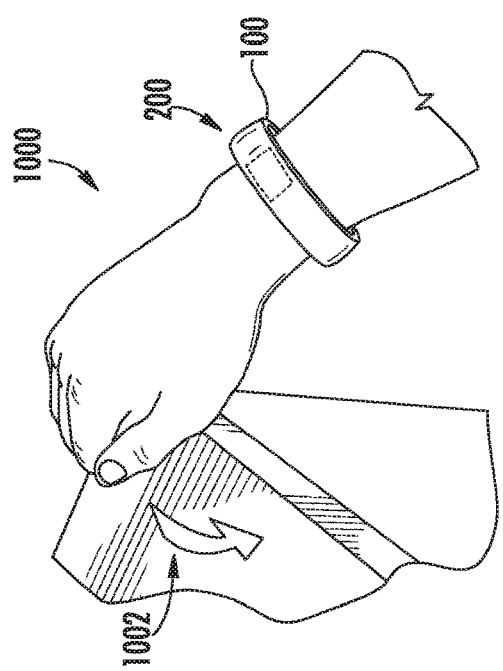
Figure 10C:
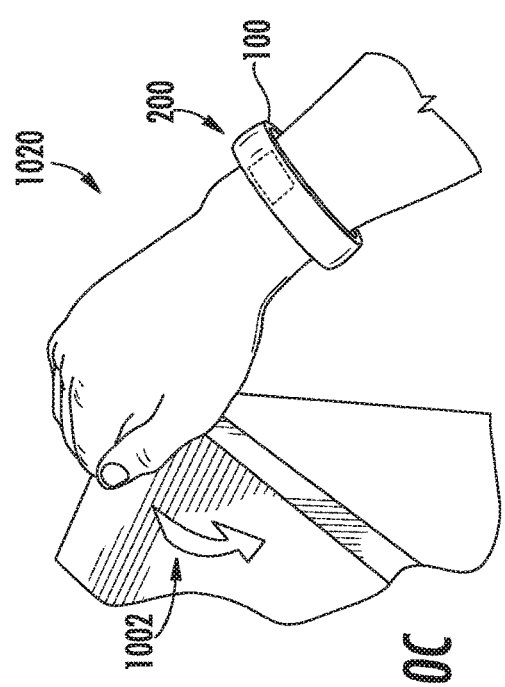

Referring now to FIGS. 10A-10D, an illustrative embodiment of a front-hand double-knock input gesture includes the wrist-wearable computing device 100 being worn on the wrist 200 of the user during the double-knock input gesture. The illustrative front-hand double-knock input gesture of FIGS. 10A-10D includes a first front-hand double-knock hand orientation 1000 of FIG. 10A that may be an initial starting hand orientation to execute the front-hand double-knock input gesture onto a surface 1002, such as a tabletop. Referring now to FIG. 10B, a second front-hand double-knock hand orientation 1010 shows the wrist 200 having been lowered such that the surface 1002 facing knuckles of the user are in contact with the surface 1002 for a moment of time. In FIG. 10C, a third front-hand double-knock hand orientation 1020 of FIG. 10C shows the user having raised the wrist 200 generally back to the first front-hand double-knock hand orientation 1000 of FIG. 10A. In FIG. 10D, a fourth front-hand double-knock hand orientation 1030 of FIG. 10D shows the user having again lowered the wrist such that the surface 1002 facing knuckles of the user are in contact with the surface 1002.

Figure 11B:
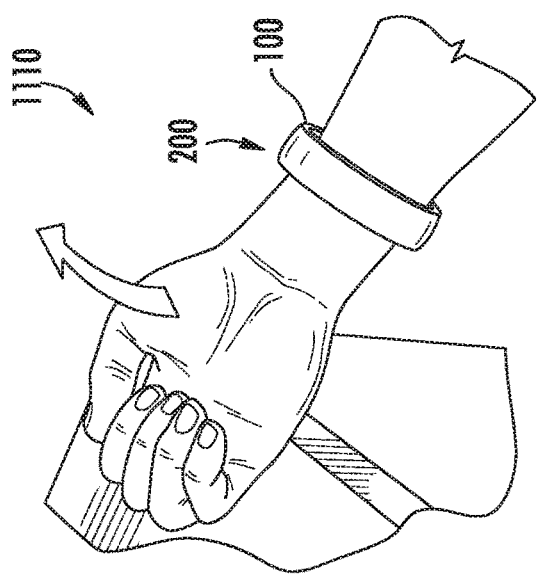
FIGS. 11A-11D are simplified illustrations of a backhand double-knock input gesture that may be performed by the user wearing the wrist-wearable computing device of FIG. 1.
Figure 11D:
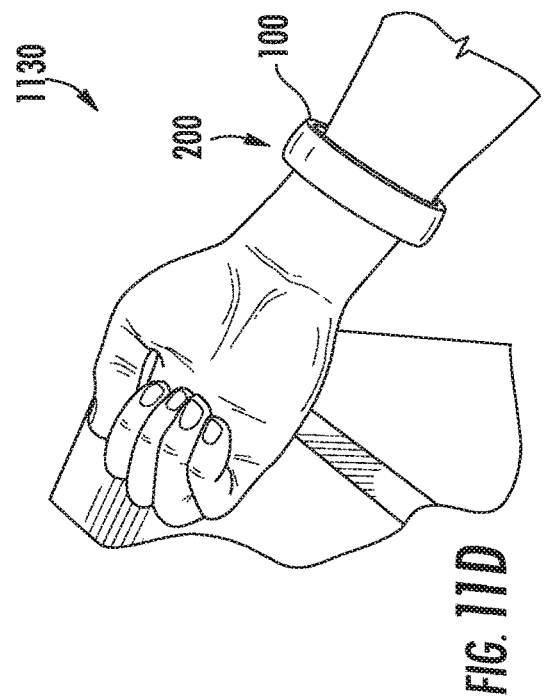
Figure 11A:
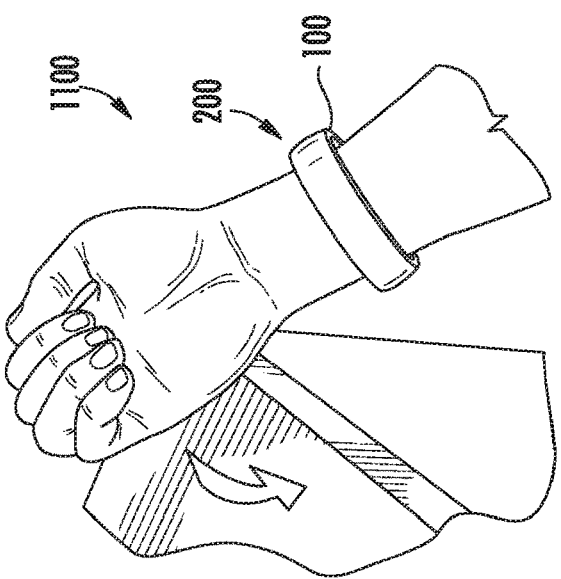
Figure 11C:
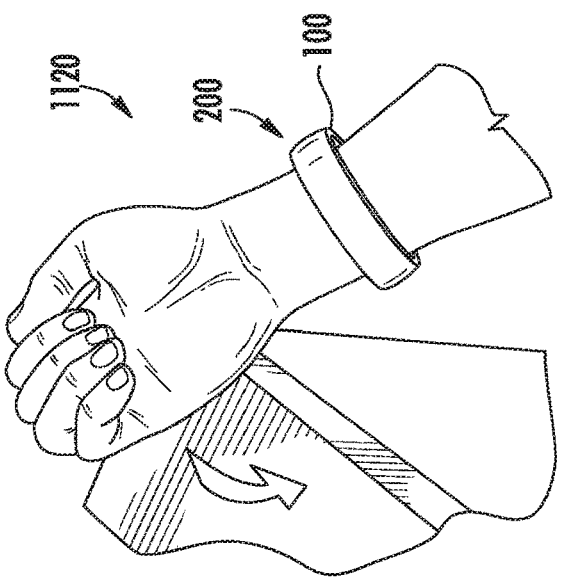

Referring now to FIGS. 11A-11D, an illustrative embodiment of a backhand double-knock input gesture includes the wrist-wearable computing device 100 being worn on the wrist 200 of the user during the backhand double-knock input gesture. The illustrative backhand double-knock input gesture of FIGS. 11A-11D includes a first backhand double-knock hand orientation 1100 of FIG. 11A that may be an initial starting hand orientation to execute the backhand double-knock input gesture onto the surface 1002. Referring now to FIG. 11B, a second backhand double-knock hand orientation 1110 shows the wrist 200 having been lowered such that the surface 1002 facing knuckles of the user are in contact with the surface 1002 for a moment of time. In FIG. 11C, a third backhand double-knock hand orientation 1120 of FIG. 11C shows the user having raised the wrist 200 generally back to the first backhand double-knock hand orientation 1100 of FIG. 11A. In FIG. 11D, a fourth backhand double-knock hand orientation 1130 of FIG. 11D shows the user having again lowered the wrist such that the surface 1002 facing knuckles of the user are in contact with the surface 1002.

Referring now to FIGS. 12A-12C, an illustrative embodiment of a wrist rotation back-and-forth input gesture includes the wrist-wearable computing device 100 being worn on the wrist 200 of the user during the wrist rotation back-and-forth input gesture. The illustrative wrist rotation back-and-forth input gesture of FIGS. 12A-12C includes a first wrist rotation back-and-forth hand orientation 1200 of FIG. 12A that may be an initial starting hand orientation to execute the wrist rotation back-and-forth input gesture, a second wrist rotation back-and-forth hand orientation 1210 of FIG. 12B that may be an intermediate hand orientation during the execution of the wrist rotation back-and-forth input gesture that shows the wrist 200 of the user having been rotated about the x-axis 202, and a third wrist rotation back-and-forth hand orientation 1220 shown in FIG. 12C that may be a final hand orientation upon completion of the wrist rotation back-and-forth input gesture that shows the wrist 200 having been rotated back about the x-axis 202 to generally the first wrist rotation back-and-forth hand orientation 1200.

Referring now to FIGS. 13A-13D, an illustrative embodiment of a double hand clap input gesture includes the wrist-wearable computing device 100 being worn on the wrist 200 of the user during the double hand clap input gesture. The illustrative double hand clap input gesture of FIGS. 13A-13D includes a first double hand clap hand orientation 1300, as shown in FIG. 13A, that illustrates each hand of the user initially separated by some distance, which may be an initial starting orientation for execution of the double hand clap input gesture. In FIG. 13B, a second double hand clap orientation 1310 shows the palms of the user having been brought into contact with each other for a period of time before being separated again, as shown in a third double hand clap hand orientation 1320 of FIG. 13A. Finally, in FIG. 13D, a fourth double hand clap hand orientation 1330 shows the palms of the user having again been brought into contact with each other.

Referring now to FIGS. 14A-14C, an illustrative embodiment of a celebration input gesture includes the wrist-wearable computing device 100 being worn on the wrist 200 of the user during the celebration input gesture. The illustrative celebration input gesture of FIGS. 14A-14C includes a first celebration hand orientation 1400, as shown in FIG. 14A, wherein the wrist 200 of the user is at rest to the side of the user, which may be an initial starting hand orientation to execute the celebration input gesture. In FIG. 14B, a second celebration hand orientation 1410 is illustrating that the wrist 200 has been raised generally to an elevation level above the shoulders, which may be an intermediate hand orientation during the execution of the celebration input gesture. Lastly, FIG. 14C illustrates a third celebration hand orientation 1420 that may be a final hand orientation upon completion of the celebration input gesture, wherein the wrist 200 is lowered to a level higher than the first celebration hand orientation 1400 and lower than the second celebration hand orientation 1410.

As described previously, each input gesture has a corresponding input gesture model. Accordingly, in an embodiment wherein each of the finger-snap input gesture of FIGS. 9A-9C, the front-hand double knock input gesture, the backhand double knock input gesture, the back-and-forth wrist rotation input gesture, the double hand clap input gesture, and the celebration gesture input gesture were to be detected, each input gesture has a corresponding model, such as a finger-snap input gesture model, a front-hand double knock input gesture model, etc.

Examples

Illustrative examples of the technologies disclosed herein are provided below. An embodiment of the technologies may include any one or more, and any combination of, the examples described below.

Example 1 includes a wrist-wearable computing device to detect micro-motion states of an input gesture, the wrist-wearable computing device comprising a micro-motion detection module to (i) receive sensor data from one or more sensors of the wrist-wearable computing device, (ii) determine a present value for each of a plurality of micro-motion states based on the received sensor data, wherein each of the micro-motion states is indicative of a motion-related characteristic of the wrist-wearable computing device, (iii) determine a present gesture step of a plurality of gesture steps based on the present values of the micro-motion states, and (iv) append the present gesture step to a sequence of detected gesture steps, wherein the sequence of detected gesture steps includes one or more previously detected gesture steps, and wherein each of the previously detected gesture steps is defined by associated previous values for each of the plurality of micro-motion states, and an input gesture recognition module to determine whether the sequence of detected gesture steps matches an input gesture model associated with an input gesture, wherein the input gesture model defines a required sequence of required gesture steps.

Example 2 includes the subject matter of Example 1, and wherein to determine whether the sequence of detected gesture steps matches the input gesture model comprises to compare, in sequential order, each detected gesture step of the sequence of detected gesture steps to a corresponding required gesture step of the required sequence of required gesture steps.

Example 3 includes the subject matter of any of Examples 1 and 2, and wherein the input gesture recognition module is further to identify the input gesture in response to a determination that the sequence of detected gesture steps sequentially matches the required sequence of required gesture steps.

Example 4 includes the subject matter of any of Examples 1-3, and wherein the input gesture recognition module is further to provide an indication of to the input gesture to an application of the wrist-wearable computing device in response to the determination that the sequence of detected gesture steps sequentially matches the required sequence of required gesture steps.

Example 5 includes the subject matter of any of Examples 1-4, and wherein the micro-motion detection module is further to (i) determine a subsequent value for each of the plurality of micro-motion states based on the sensor data in response to a determination by the input gesture recognition module that the sequence of detected gesture steps matches at least a portion of at least one input gesture model of a plurality of input gesture models, (ii) determine a subsequent gesture step of the plurality of gesture steps based on the subsequent values of the micro-motion states, (iii) append the subsequent gesture step to the sequence of detected gesture steps to generate an updated sequence of detected gesture steps, and wherein the input gesture recognition module is further to determine whether the updated sequence of detected gesture steps matches the input gesture model associated with the input gesture.

Example 6 includes the subject matter of any of Examples 1-5, and wherein the micro-motion detection module is further to update the sequence of detected gesture steps in response to a determination by the input gesture recognition module that the sequence of detected gesture steps does not match at least a portion of at least one input gesture model of a plurality of input gesture models, wherein each input gesture model of the plurality of input gesture models defines a corresponding required sequence of required gesture steps.

Example 7 includes the subject matter of any of Examples 1-6, and wherein to update the sequence of detected gesture steps comprises to clear the sequence of detected gesture steps, keep only a most recently appended gesture step in the sequence of detected gesture steps, or remove an oldest gesture step from the sequence of detected gesture steps.

Example 8 includes the subject matter of any of Examples 1-7, and wherein to receive sensor data from the one or more sensors of the wrist-wearable computing device comprises to receive the sensor data from an accelerometer of the wrist-wearable computing device.

Example 9 includes the subject matter of any of Examples 1-8, and wherein to receive sensor data from the one or more sensors of the wrist-wearable computing device comprises to receive the sensor data from a gyroscope of the wrist-wearable computing device.

Example 10 includes the subject matter of any of Examples 1-9, and wherein to receive sensor data from the one or more sensors of the wrist-wearable computing device comprises to receive the sensor data from a magnetometer of the wrist-wearable computing device.

Example 11 includes the subject matter of any of Examples 1-10, and wherein to determine the present value for each of the micro-motion states of the plurality of micro-motion states comprises determining a present value for at least one of a motion micro-motion state, an orientation micro-motion state, a rotation micro-motion state, a linear motion micro-motion state, an impact micro-motion state, and a shaking micro-motion state.

Example 12 includes the subject matter of any of Examples 1-11, and wherein to determine the present value for the rotation micro-motion state comprises to determine a present value for at least one of a first rotation along an x-axis, a second rotation along a y-axis, and a third rotation along a z-axis.

Example 13 includes the subject matter of any of Examples 1-12, and wherein to determine the present value for the linear motion micro-motion state comprises to determine a present value for at least one of a first linear motion micro-motion state corresponding to an x-axis, a second linear motion micro-motion state corresponding to a y-axis, and a third linear motion micro-motion state corresponding to a z-axis.

Example 14 includes the subject matter of any of Examples 1-13, and wherein to compare each gesture step of the sequence of detected gesture steps to each gesture step of the input gesture model comprises to compare each gesture step of the sequence of detected gesture steps to at least one of a finger-snap input gesture model, a front-hand double knock input gesture model, a backhand double knock input gesture model, a back-and-forth wrist rotation input gesture model, a double hand clap input gesture model, and a celebration gesture input gesture model.

Example 15 includes the subject matter of any of Examples 1-14, and wherein to determine the present value comprises to determine at least one of a movement, an orientation, a rotation, and a direction relative to a three-dimension axis.

Example 16 includes a method for detecting micro-motion states of an input gesture, the method comprising receiving, by a wrist-wearable computing device, sensor data from one or more sensors of the wrist-wearable computing device; determining, by the wrist-wearable computing device, a present value for each of a plurality of micro-motion states based on the received sensor data, wherein each of the micro-motion states is indicative of a motion-related characteristic of the wrist-wearable computing device; determining, by the wrist-wearable computing device, a present gesture step of a plurality of gesture steps based on the present values of the micro-motion states; appending, by the wrist-wearable computing device, the present gesture step to a sequence of detected gesture steps, wherein the sequence of detected gesture steps includes one or more previously detected gesture steps, and wherein each of the previously detected gesture steps is defined by associated previous values for each of the plurality of micro-motion states; and determining, by the wrist-wearable computing device, whether the sequence of detected gesture steps matches an input gesture model associated with an input gesture, wherein the input gesture model defines a required sequence of required gesture steps.

Example 17 includes the subject matter of Example 16, and wherein determining whether the sequence of detected gesture steps matches the input gesture model comprises comparing, in sequential order, each detected gesture step of the sequence of detected gesture steps to a corresponding required gesture step of the required sequence of required gesture steps.

Example 18 includes the subject matter of any of Examples 16 and 17, and further including identifying, by the wrist-wearable computing device, the input gesture in response to a determination that the sequence of detected gesture steps sequentially matches the required sequence of required gesture steps.

Example 19 includes the subject matter of any of Examples 16-18, and further including providing, by the wrist-wearable computing device, an indication of to the input gesture to an application of the wrist-wearable computing device in response to the determination that the sequence of detected gesture steps sequentially matches the required sequence of required gesture steps.

Example 20 includes the subject matter of any of Examples 16-19, and further including, in response to a determination that the sequence of detected gesture steps matches at least a portion of at least one input gesture model of a plurality of input gesture models determining, by the wrist-wearable computing device, a subsequent value for each of the plurality of micro-motion states based on the sensor data; determining, by the wrist-wearable computing device, a subsequent gesture step of the plurality of gesture steps based on the subsequent values of the micro-motion states; appending, by the wrist-wearable computing device, the subsequent gesture step to the sequence of detected gesture steps to generate an updated sequence of detected gesture steps; and determining, by the wrist-wearable computing device, whether the updated sequence of detected gesture steps matches the input gesture model associated with the input gesture.

Example 21 includes the subject matter of any of Examples 16-20, and further including updating the sequence of detected gesture steps in response to a determination that the sequence of detected gesture steps does not match at least a portion of at least one input gesture model of a plurality of input gesture models, wherein each input gesture model of the plurality of input gesture models defines a corresponding required sequence of required gesture steps.

Example 22 includes the subject matter of any of Examples 16-21, and wherein updating the sequence of detected gesture steps comprises clearing the sequence of detected gesture steps, keeping only a most recently appended gesture step in the sequence of detected gesture steps, or removing an oldest gesture step from the sequence of detected gesture steps.

Example 23 includes the subject matter of any of Examples 16-22, and wherein receiving the sensor data from the one or more sensors of the wrist-wearable computing device comprises receiving the sensor data from an accelerometer of the wrist-wearable computing device.

Example 24 includes the subject matter of any of Examples 16-23, and wherein receiving the sensor data from the one or more sensors of the wrist-wearable computing device comprises receiving the sensor data from a gyroscope of the wrist-wearable computing device.

Example 25 includes the subject matter of any of Examples 16-24, and wherein receiving the sensor data from the one or more sensors of the wrist-wearable computing device comprises receiving the sensor data from a magnetometer of the wrist-wearable computing device.

Example 26 includes the subject matter of any of Examples 16-25, and wherein determining the present value for each of the micro-motion states of the plurality of micro-motion states comprises determining a present value for at least one of a motion micro-motion state, an orientation micro-motion state, a rotation micro-motion state, a linear motion micro-motion state, an impact micro-motion state, and a shaking micro-motion state.

Example 27 includes the subject matter of any of Examples 16-26, and wherein determining the present value for the rotation micro-motion state comprises determining a present value for at least one of a first rotation along an x-axis, a second rotation along a y-axis, and a third rotation along a z-axis.

Example 28 includes the subject matter of any of Examples 16-27, and wherein determining the present value for the linear motion micro-motion state comprises determining a present value for at least one of a first linear motion micro-motion state corresponding to an x-axis, a second linear motion micro-motion state corresponding to a y-axis, and a third linear motion micro-motion state corresponding to a z-axis.

Example 29 includes the subject matter of any of Examples 16-28, and wherein comparing each gesture step of the sequence of detected gesture steps to each gesture step of the input gesture model comprises comparing each gesture step of the sequence of detected gesture steps to at least one of a finger-snap input gesture model, a front-hand double knock input gesture model, a backhand double knock input gesture model, a back-and-forth wrist rotation input gesture model, a double hand clap input gesture model, and a celebration gesture input gesture model.

Example 30 includes the subject matter of any of Examples 16-29, and wherein determining the present value comprises determining at least one of a movement, an orientation, a rotation, and a direction relative to a three-dimension axis.

Example 31 includes a computing device comprising a processor; and a memory having stored therein a plurality of instructions that when executed by the processor cause the computing device to perform the method of any of Examples 16-30.

Example 32 includes one or more machine readable storage media comprising a plurality of instructions stored thereon that in response to being executed result in a computing device performing the method of any of Examples 16-30.

Example 33 includes a wrist-wearable computing device for detecting micro-motion states of an input gesture, the wrist-wearable computing device comprising means for receiving sensor data from one or more sensors of the wrist-wearable computing device; means for determining a present value for each of a plurality of micro-motion states based on the received sensor data, wherein each of the micro-motion states is indicative of a motion-related characteristic of the wrist-wearable computing device; means for determining a present gesture step of a plurality of gesture steps based on the present values of the micro-motion states; means for appending the present gesture step to a sequence of detected gesture steps, wherein the sequence of detected gesture steps includes one or more previously detected gesture steps, and wherein each of the previously detected gesture steps is defined by associated previous values for each of the plurality of micro-motion states; and means for determining whether the sequence of detected gesture steps matches an input gesture model associated with an input gesture, wherein the input gesture model defines a required sequence of required gesture steps.

Example 34 includes the subject matter of Example 33, and wherein the means for determining whether the sequence of detected gesture steps matches the input gesture model comprises means for comparing, in sequential order, each detected gesture step of the sequence of detected gesture steps to a corresponding required gesture step of the required sequence of required gesture steps.

Example 35 includes the subject matter of any of Examples 33 and 34, and further including means for identifying the input gesture in response to a determination that the sequence of detected gesture steps sequentially matches the required sequence of required gesture steps.

Example 36 includes the subject matter of any of Examples 33-35, and further including means for providing an indication of to the input gesture to an application of the wrist-wearable computing device in response to the determination that the sequence of detected gesture steps sequentially matches the required sequence of required gesture steps.

Example 37 includes the subject matter of any of Examples 33-36, and further including, in response to a determination that the sequence of detected gesture steps matches at least a portion of at least one input gesture model of a plurality of input gesture models means for determining a subsequent value for each of the plurality of micro-motion states based on the sensor data; means for determining a subsequent gesture step of the plurality of gesture steps based on the subsequent values of the micro-motion states; means for appending the subsequent gesture step to the sequence of detected gesture steps to generate an updated sequence of detected gesture steps; and means for determining whether the updated sequence of detected gesture steps matches the input gesture model associated with the input gesture.

Example 38 includes the subject matter of any of Examples 33-37, and further including means for updating the sequence of detected gesture steps in response to a determination that the sequence of detected gesture steps does not match at least a portion of at least one input gesture model of a plurality of input gesture models, wherein each input gesture model of the plurality of input gesture models defines a corresponding required sequence of required gesture steps.

Example 39 includes the subject matter of any of Examples 33-38, and wherein the means for updating the sequence of detected gesture steps comprises means for clearing the sequence of detected gesture steps, means for keeping only a most recently appended gesture step in the sequence of detected gesture steps, or means for removing an oldest gesture step from the sequence of detected gesture steps.

Example 40 includes the subject matter of any of Examples 33-39, and wherein the means for receiving the sensor data from the one or more sensors of the wrist-wearable computing device comprises means for receiving the sensor data from an accelerometer of the wrist-wearable computing device.

Example 41 includes the subject matter of any of Examples 33-40, and wherein the means for receiving the sensor data from the one or more sensors of the wrist-wearable computing device comprises means for receiving the sensor data from a gyroscope of the wrist-wearable computing device.

Example 42 includes the subject matter of any of Examples 33-41, and wherein the means for receiving the sensor data from the one or more sensors of the wrist-wearable computing device comprises means for receiving the sensor data from a magnetometer of the wrist-wearable computing device.

Example 43 includes the subject matter of any of Examples 33-42, and wherein the means for determining the present value for each of the micro-motion states of the plurality of micro-motion states comprises means for determining a present value for at least one of a motion micro-motion state, an orientation micro-motion state, a rotation micro-motion state, a linear motion micro-motion state, an impact micro-motion state, and a shaking micro-motion state.

Example 44 includes the subject matter of any of Examples 33-43, and wherein the means for determining the present value for the rotation micro-motion state comprises means for determining a present value for at least one of a first rotation along an x-axis, a second rotation along a y-axis, and a third rotation along a z-axis.

Example 45 includes the subject matter of any of Examples 33-44, and wherein the means for determining the present value for the linear motion micro-motion state comprises means for determining a present value for at least one of a first linear motion micro-motion state corresponding to an x-axis, a second linear motion micro-motion state corresponding to a y-axis, and a third linear motion micro-motion state corresponding to a z-axis.

Example 46 includes the subject matter of any of Examples 33-45, and wherein the means for comparing each gesture step of the sequence of detected gesture steps to each gesture step of the input gesture model comprises means for comparing each gesture step of the sequence of detected gesture steps to at least one of a finger-snap input gesture model, a front-hand double knock input gesture model, a backhand double knock input gesture model, a back-and-forth wrist rotation input gesture model, a double hand clap input gesture model, and a celebration gesture input gesture model.

Example 47 includes the subject matter of any of Examples 33-46, and wherein the means for determining the present value comprises means for determining at least one of a movement, an orientation, a rotation, and a direction relative to a three-dimension axis.

The invention claimed is:

1. A wrist-wearable computing device to detect micro-motion states of an input gesture, the wrist-wearable computing device comprising:
a micro-motion detection circuit to (i) receive sensor data from one or more sensors of the wrist-wearable computing device, (ii) determine a present value for each of a plurality of micro-motion states based on the received sensor data, wherein each of the micro-motion states is indicative of a motion-related characteristic of the wrist-wearable computing device, wherein to determine a present value for each of a plurality of micro-motion states comprises to classify, for each of the plurality of micro-motion states, the corresponding micro-motion state into one of a plurality of pre-defined micro-motion state values, wherein the plurality of micro-motion states includes a linear motion micro-motion state, (iii) determine a present gesture step of a plurality of gesture steps based on the present values of the micro-motion states, and (iv) append the present gesture step to a sequence of detected gesture steps, wherein the sequence of detected gesture steps includes one or more previously detected gesture steps, and wherein each of the previously detected gesture steps is defined by associated previous values for each of the plurality of micro-motion states; and
an input gesture recognition circuit to determine whether the sequence of detected gesture steps matches an input gesture model associated with an input gesture, wherein the input gesture model defines a required sequence of required gesture steps.

2. The wrist-wearable computing device of claim 1, wherein to determine whether the sequence of detected gesture steps matches the input gesture model comprises to compare, in sequential order, each detected gesture step of the sequence of detected gesture steps to a corresponding required gesture step of the required sequence of required gesture steps.

3. The wrist-wearable computing device of claim 1, wherein the micro-motion detection circuit is further to (i) determine a subsequent value for each of the plurality of micro-motion states based on the sensor data in response to a determination by the input gesture recognition circuit that the sequence of detected gesture steps matches at least a portion of at least one input gesture model of a plurality of input gesture models, (ii) determine a subsequent gesture step of the plurality of gesture steps based on the subsequent values of the micro-motion states, (iii) append the subsequent gesture step to the sequence of detected gesture steps to generate an updated sequence of detected gesture steps, and
wherein the input gesture recognition circuit is further to determine whether the updated sequence of detected gesture steps matches the input gesture model associated with the input gesture.

4. The wrist-wearable computing device of claim 1, wherein the micro-motion detection circuit is further to update the sequence of detected gesture steps in response to a determination by the input gesture recognition circuit that the sequence of detected gesture steps does not match at least a portion of at least one input gesture model of a plurality of input gesture models, wherein each input gesture model of the plurality of input gesture models defines a corresponding required sequence of required gesture steps.

5. The wrist-wearable computing device of claim 1, wherein to receive sensor data from the one or more sensors of the wrist-wearable computing device comprises to receive the sensor data from at least one of an accelerometer of the wrist-wearable computing device, a gyroscope of the wrist-wearable computing device, and a magnetometer of the wrist-wearable computing device.

6. The wrist-wearable computing device of claim 1, wherein to determine the present value for each of the micro-motion states of the plurality of micro-motion states comprises determining a present value for at least one of a motion micro-motion state, an orientation micro-motion state, a rotation micro-motion state, an impact micro-motion state, and a shaking micro-motion state.

7. The wrist-wearable computing device of claim 6, wherein to determine the present value for the rotation micro-motion state comprises to determine a present value for at least one of a first rotation along an x-axis, a second rotation along a y-axis, and a third rotation along a z-axis.

8. The wrist-wearable computing device of claim 6, wherein to determine the present value for the linear motion micro-motion state comprises to determine a present value for at least one of a first linear motion micro-motion state corresponding to an x-axis, a second linear motion micro-motion state corresponding to a y-axis, and a third linear motion micro-motion state corresponding to a z-axis.

9. The wrist-wearable computing device of claim 1, wherein to determine the present value comprises to determine at least one of a movement, an orientation, a rotation, and a direction relative to a three-dimension axis.

10. The wrist-wearable computing device of claim 1, wherein the input gesture model defines a maximum amount of time that may elapse between each of the required gesture steps.

11. The wrist-wearable computing device of claim 1, wherein the input gesture recognition circuit is configured to:
receive a new input gesture model; and
add the new input gesture model to the input gesture recognition circuit.

12. The wrist-wearable computing device of claim 1, wherein to determine the present value for each of the plurality of micro-motion states comprises to classify, for each of the plurality of micro-motion states, the corresponding micro-motion state into one of a plurality of pre-defined linear motion micro-motion state values,
wherein the plurality of pre-defined linear motion micro-motion state values correspond to no linear motion, a slow linear motion, and a fast linear motion.

13. The wrist-wearable computing device of claim 1, wherein the plurality of micro-motion states comprises a finger snap state or an impact state.

14. The wrist-wearable computing device of claim 1, wherein the plurality of micro-motion states comprises a front hand double knock or back hand double knock.

15. One or more non-transitory computer-readable storage media comprising a plurality of instructions stored thereon that in response to being executed cause a wrist-wearable computing device to:
receive sensor data from one or more sensors of the wrist-wearable computing device;
determine a present value for each of a plurality of micro-motion states based on the received sensor data, wherein each of the micro-motion states is indicative of a motion-related characteristic of the wrist-wearable computing device, wherein to determine a present value for each of a plurality of micro-motion states comprises to classify, for each of the plurality of micro-motion states, the corresponding micro-motion state into one of a plurality of pre-defined micro-motion state values, wherein the plurality of micro-motion states includes a linear motion micro-motion state;
determine a present gesture step of a plurality of gesture steps based on the present values of the micro-motion states;
append the present gesture step to a sequence of detected gesture steps, wherein the sequence of detected gesture steps includes one or more previously detected gesture steps, and wherein each of the previously detected gesture steps is defined by associated previous values for each of the plurality of micro-motion states; and
determine whether the sequence of detected gesture steps matches an input gesture model associated with an input gesture, wherein the input gesture model defines a required sequence of required gesture steps.

16. The one or more non-transitory computer-readable storage media of claim 15, wherein to determine whether the sequence of detected gesture steps matches the input gesture model comprises to compare, in sequential order, each detected gesture step of the sequence of detected gesture steps to a corresponding required gesture step of the required sequence of required gesture steps.

17. The one or more non-transitory computer-readable storage media of claim 15, further comprising a plurality of instructions that in response to being executed cause the wrist-wearable computing device to, in response to a determination that the sequence of detected gesture steps matches at least a portion of at least one input gesture model of a plurality of input gesture models:
determine a subsequent value for each of the plurality of micro-motion states based on the sensor data;
determine a subsequent gesture step of the plurality of gesture steps based on the subsequent values of the micro-motion states;
append the subsequent gesture step to the sequence of detected gesture steps to generate an updated sequence of detected gesture steps; and
determine whether the updated sequence of detected gesture steps matches the input gesture model associated with the input gesture.

18. The one or more non-transitory computer-readable storage media of claim 15, further comprising a plurality of instructions that in response to being executed cause the wrist-wearable computing device to update the sequence of detected gesture steps in response to a determination that the sequence of detected gesture steps does not match at least a portion of at least one input gesture model of a plurality of input gesture models, wherein each input gesture model of the plurality of input gesture models defines a corresponding required sequence of required gesture steps.

19. The one or more non-transitory computer-readable storage media of claim 18, wherein to update the sequence of detected gesture steps comprises to clear the sequence of detected gesture steps, keep only a most recently appended gesture step in the sequence of detected gesture steps, or remove an oldest gesture step from the sequence of detected gesture steps.

20. The one or more non-transitory computer-readable storage media of claim 15, wherein to receive the sensor data from the one or more sensors of the wrist-wearable computing device comprises to receive the sensor data from at least one of an accelerometer of the wrist-wearable computing device, a gyroscope of the wrist-wearable computing device, and a magnetometer of the wrist-wearable computing device.

21. The one or more non-transitory computer-readable storage media of claim 15, wherein to determine the present value for each of the micro-motion states of the plurality of micro-motion states comprises to determine a present value for at least one of a motion micro-motion state, an orientation micro-motion state, a rotation micro-motion state, an impact micro-motion state, and a shaking micro-motion state.

22. The one or more non-transitory computer-readable storage media of claim 21, wherein to determine the present value for the rotation micro-motion state comprises to determine a present value for at least one of a first rotation along an x-axis, a second rotation along a y-axis, and a third rotation along a z-axis.

23. The one or more non-transitory computer-readable storage media of claim 21, wherein to determine the present value for the linear motion micro-motion state comprises to determine a present value for at least one of a first linear motion micro-motion state corresponding to an x-axis, a second linear motion micro-motion state corresponding to a y-axis, and a third linear motion micro-motion state corresponding to a z-axis.

24. The one or more non-transitory computer-readable storage media of claim 15, wherein to determine the present value comprises to determine at least one of a movement, an orientation, a rotation, and a direction relative to a three-dimension axis.

25. One or more non-transitory computer-readable storage media comprising a plurality of instructions stored thereon that in response to being executed cause a wrist-wearable computing device to:
receive sensor data from one or more sensors of the wrist-wearable computing device;
determine a present value for each of a plurality of micro-motion states based on the received sensor data, wherein each of the micro-motion states is indicative of a motion-related characteristic of the wrist-wearable computing device;
determine a present gesture step of a plurality of gesture steps based on the present values of the micro-motion states;
append the present gesture step to a sequence of detected gesture steps, wherein the sequence of detected gesture steps includes one or more previously detected gesture steps, and wherein each of the previously detected gesture steps is defined by associated previous values for each of the plurality of micro-motion states; and determine whether the sequence of detected gesture steps matches an input gesture model associated with an input gesture, wherein the input gesture model defines a required sequence of required gesture steps, wherein to compare each gesture step of the sequence of detected gesture steps to each gesture step of the input gesture model comprises to compare each gesture step of the sequence of detected gesture steps to at least one of a finger-snap input gesture model, a front-hand double knock input gesture model, a backhand double knock input gesture model, a back-and-forth wrist rotation input gesture model, a double hand clap input gesture model, and a celebration gesture input gesture model.

* * * * *